US010005095B2

(12) United States Patent
Voelker

(10) Patent No.: US 10,005,095 B2
(45) Date of Patent: Jun. 26, 2018

(54) DISPENSING ASSEMBLIES AND RELATED METHODS

(71) Applicant: Monsanto Technology LLC, St. Louis, MO (US)

(72) Inventor: Scott C. Voelker, St. Louis, MO (US)

(73) Assignee: Monsanto Technology LLC, St. Louis, MO (US)

( * ) Notice: Subject to any disclaimer, the term of this patent is extended or adjusted under 35 U.S.C. 154(b) by 276 days.

(21) Appl. No.: 14/695,030

(22) Filed: Apr. 23, 2015

(65) Prior Publication Data

US 2015/0231659 A1    Aug. 20, 2015

Related U.S. Application Data

(63) Continuation-in-part of application No. 14/435,357, filed as application No. PCT/US2013/064815 on Oct. 14, 2013.

(Continued)

(51) Int. Cl.
*B05B 15/06* (2006.01)
*B05B 9/04* (2006.01)
(Continued)

(52) U.S. Cl.
CPC ......... *B05B 15/061* (2013.01); *A01M 7/0046* (2013.01); *B05B 9/0426* (2013.01);
(Continued)

(58) Field of Classification Search
CPC ............. B65D 25/2805; A01M 7/0046; Y10T 29/49826; B05B 9/0426; B05B 11/0008;
(Continued)

(56) References Cited

U.S. PATENT DOCUMENTS 2,752,200 A * 6/1956 Santarelli .............. B05B 9/0426
222/175
3,095,123 A * 6/1963 Smith, Sr. .............. A62C 15/00
220/501
(Continued)

FOREIGN PATENT DOCUMENTS

EP     1 010 389 A2    6/2000
EP     1 205 253 A2    5/2002
(Continued)

OTHER PUBLICATIONS

Organic Weed & Grass Killer, http://www.planetnatural.com/site/ecosmart-weed-killer.html, printed Jan. 21, 2013, 2 pages.
(Continued)

*Primary Examiner* — Nicholas J Weiss
(74) *Attorney, Agent, or Firm* — Erin C. Robert; Harness, Dickey & Pierce, P.L.C.

(57) ABSTRACT

A dispensing assembly for dispensing fluid generally includes a container having a handle located toward an upper portion of the container, and a sprayer having arms extending away from the sprayer. The arms of the sprayer define a channel configured to receive at least part of the handle of the container within the channel to thereby couple the sprayer to the container. Such a dispensing assembly can be made by forming the container with a handle located toward an upper portion of the container, and forming the sprayer with the arms such that the arms can be used to couple the sprayer to the handle of the container, where the arms extend away from the sprayer and define the channel for receiving at least part of the handle of the container into the channel.

20 Claims, 24 Drawing Sheets

Related U.S. Application Data

(60) Provisional application No. 61/714,018, filed on Oct. 15, 2012, provisional application No. 61/840,266, filed on Jun. 27, 2013.

(51) Int. Cl.
  *A01M 7/00*     (2006.01)
  *B05B 11/00*    (2006.01)
  *B05B 15/62*    (2018.01)
  *B05B 15/63*    (2018.01)

(52) U.S. Cl.
  CPC ...... *B05B 11/0008* (2013.01); *B05B 11/0037* (2013.01); *B05B 15/62* (2018.02); *B05B 15/63* (2018.02); *B05B 11/3057* (2013.01); *Y10T 29/49826* (2015.01)

(58) Field of Classification Search
  CPC ............. B05B 11/0037; B05B 11/3057; B05B 15/061; B05B 15/06
  USPC ......... 222/538, 383.3, 530, 192, 465.1, 323, 222/191; 239/526, 531; 248/689, 79, 248/593
  See application file for complete search history.

(56) References Cited

U.S. PATENT DOCUMENTS

| | | | |
|---|---|---|---|
| 3,871,584 A | | 3/1975 | Wagner |
| 3,901,449 A | * | 8/1975 | Bochmann ............ B05B 9/0861 239/332 |
| D254,321 S | * | 2/1980 | Sidor ........................... D23/225 |
| 4,621,770 A | | 11/1986 | Sayen |
| 4,925,066 A | * | 5/1990 | Rosenbaum ........ B05B 11/0037 215/10 |
| 5,088,903 A | * | 2/1992 | Tomatsu ................... B05B 7/12 239/526 |
| 5,469,993 A | | 11/1995 | Hauf |
| 5,553,750 A | | 9/1996 | Foster |
| 5,601,211 A | | 2/1997 | Foster |
| 5,609,272 A | | 3/1997 | Brass |
| D380,148 S | | 6/1997 | Hauf |
| 5,651,908 A | | 7/1997 | Mansfield |
| 5,755,361 A | | 5/1998 | Restive |
| 5,860,574 A | | 1/1999 | Shanklin |
| 6,367,665 B1 | | 4/2002 | Barriac |
| 6,508,410 B1 | * | 1/2003 | Thomas, Jr. .......... B05B 15/061 222/530 |
| 6,644,564 B2 | * | 11/2003 | Perkitny ............... B05B 9/0861 239/332 |
| 6,820,769 B2 | | 11/2004 | Foster |
| 7,607,556 B2 | | 10/2009 | Engelen |
| 7,631,818 B2 | | 12/2009 | Wu |
| 7,717,354 B1 | | 5/2010 | Robinson |
| 7,819,292 B2 | | 10/2010 | Arcuri |
| 8,038,038 B2 | | 10/2011 | Hillhouse |
| 8,100,302 B2 | | 1/2012 | Bonner |
| 8,141,754 B2 | | 3/2012 | Conner |
| D702,549 S | | 4/2014 | Meyer |
| D713,001 S | * | 9/2014 | Voelker ........................ D23/213 |
| D713,499 S | * | 9/2014 | Voelker ........................ D23/225 |
| 9,113,771 B2 | * | 8/2015 | Zach ..................... B05B 15/061 |
| D765,224 S | * | 8/2016 | Voelker ........................ D23/225 |
| 9,497,953 B2 | * | 11/2016 | Mitchell ............... B05B 9/0426 |
| 2002/0125341 A1 | | 9/2002 | Perkitny |
| 2004/0149877 A1 | | 8/2004 | Hermann |
| 2008/0223958 A1 | * | 9/2008 | Carey .................. B05B 15/061 239/526 |
| 2013/0193232 A1 | | 8/2013 | Dobias |
| 2015/0251813 A1 | | 9/2015 | Voelker |

FOREIGN PATENT DOCUMENTS

| | | |
|---|---|---|
| EP | 1 695 767 A1 | 8/2006 |
| WO | WO 95/15220 | 6/1995 |
| WO | WO 99/51354 | 10/1999 |
| WO | WO 00/27270 | 5/2000 |
| WO | WO 01/42129 | 6/2001 |
| WO | WO 14/62560 A1 | 4/2014 |

OTHER PUBLICATIONS

The Home Depot, Spectracide 1.3 gal. Ready-to-Use Termite and Carpenter Ant Killer, http://www.homedepot.com/h_d1/N-5yclv/R-100046531/h_d2/ProductDisplay?catalogId= . . . , printed Jan. 21, 2013, 3 pages.
Quaker State Oil 10W30, http://shop.advanceautoparts.com/webapp/wcs/stores/servlet/product_x_10142274-P_x_x? . . . , printed Jan. 21, 2013, 2 pages.
The Home Depot, ZEP 1 gal. Flea Spray for Homes, http://www.homedepot.com/h_d1/N-5yclv/R-100036174/h_d2/ProductDisplay?catalogId= . . . , printed Jan. 21, 2013, 3 pages.
Tool King.com, Access Marketing SDSB-1G/02 Slime Spray Tire Sealant with Pump—1 Gallon, http://www.toolking.com/access-marketing-sdsb-1g-02-spray-tire-sealant-with-pump-gallon, printed Jan. 21, 2013, 2 pages.
The Home Depot, Raid Max 128 oz. Bug Barrier, http://www.homedepot.com/h_d1/N-5yclv/R-202529882/h_d2/ProductDisplay?catalogId= . . . , printed Jan. 21, 2013, 3 pages.
Campman, Repel Camp Shield Outdoor Insect Control, http://www.campman.com/repel-camp-shield-outdoor-insect-control/, printed Jan. 21, 2013, 1 page.
The Home Depot, Bayer Advanced 1.3 gal. Durazone Weed and Grass Killer, http://www.homedepot.com/h_d1/N-5yclv/R-203030477/h_d2/ProductDisplay?catalogId= . . . , printed Jan. 21, 2013, 3 pages.
The Home Depot, Bayer Advanced 1-Gallon Ready-to-Use Home Pest Plus Germ Killer, http://www.homedepot.com/h_d1/N-5yclv/R-100638301/h_d2/ProductDisplay?catalogId= . . . , printed Jan. 21, 2013, 4 pages.
The Home Depot, Ortho 1-Gallon Ready-to-Use Weed-B-Gon Max Plus Crabgrass Control, http://www.homedepot.com/h_d1/N-5yclv/R-100542812/h_d2/ProductDisplay?catalogId= . . . , printed Jan. 21, 2013, 2 pages.
Roundup Gallon Weed and Grass Killer, http://www.lowes.com/pd_90460-446-5003210_0 ?productId=3653980&Ntt=roundup& . . . , printed Jan. 21, 2013, 2 pages.
MWV: Mixor® HP Remote Trigger Sprayer, http://www.meadwestvaco.com/HomeandGardenPackaging/TriggerSprayers/MWVS023012, printed Apr. 10, 2013, 3 pages.

* cited by examiner

DISPENSING ASSEMBLIES AND RELATED METHODS

CROSS-REFERENCE TO RELATED APPLICATIONS

This application is a continuation-in-part of U.S. patent application Ser. No. 14/435,357, filed on Apr. 13, 2015, which is a U.S. National Stage of International Application No. PCT/US2013/064815, filed on Oct. 14, 2013, which claims the benefit of, and priority to, U.S. Provisional Application No. 61/714,018, filed on Oct. 15, 2012, and U.S. Provisional Application No. 61/840,266, filed on Jun. 27, 2013. The entire disclosures of each of the above applications are incorporated herein by reference.

FIELD

The present disclosure generally relates to dispensing assemblies, and to methods of making and using such dispensing assemblies.

BACKGROUND

This section provides background information related to the present disclosure which is not necessarily prior art.

Fluids such as pesticides and herbicides are often used in and around homes, lawns and gardens to kill undesirable insects, plants, etc. Typically, the fluids are provided in bottles. And, sprayers are coupled to the bottles by tubing for applying the fluids to desired targets.

SUMMARY

This section provides a general summary of the disclosure, and is not a comprehensive disclosure of its full scope or all of its features.

Example embodiments of the present disclosure generally relate to dispensing assemblies for dispensing fluids. In one example embodiment, such a dispensing assembly generally includes a container having a handle located toward an upper portion of the container, and a sprayer having an arm extending away from an upper surface of the sprayer. The arm defines a channel configured to receive at least part of the handle of the container within the channel to thereby couple the sprayer to the container.

In another example embodiment, a dispensing assembly generally includes a container having an upper portion, and a sprayer having an arm extending away from the sprayer. The arm of the sprayer is configured to couple to the container such that an upper surface of the sprayer is generally coplanar with the upper portion of the container.

In another example embodiment, a dispensing assembly generally includes a container having a handle located toward an upper portion of the container for use in carrying the container, and a sprayer having a clip portion for use in coupling the sprayer to the container. The clip portion of the sprayer defines a channel configured to receive at least part of the handle of the container within the channel to thereby couple the sprayer to the container.

In another example embodiment, a dispensing assembly generally includes a container having an upper portion and a handle located toward the upper portion of the container for use in carrying the container, and a sprayer having a head portion and first and second arms extending away from the head portion. The first and second arms are configured to receive at least part the handle of the container between the arms for coupling the sprayer to the container.

Example embodiments of the present disclosure also generally relate to methods of making dispensing assemblies suitable for use in dispensing fluids. In one example embodiment, such a method generally includes forming a container having a handle located toward an upper portion of the container, and forming a sprayer having a clip portion for coupling the sprayer to the handle of the container, where the clip portion extends away from the sprayer and defines a channel configured to receive at least part of the handle of the container into the channel to thereby couple the sprayer to the handle of the container.

In another example embodiment, a method of making a dispensing assembly generally includes forming a container having a handle located toward an upper portion of the container, and forming a sprayer having first and second arms extending away from the sprayer for coupling the sprayer to the handle of the container. The first and second arms then define a channel therebetween configured to receive at least part of the handle of the container into the channel to thereby couple the sprayer to the handle of the container.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
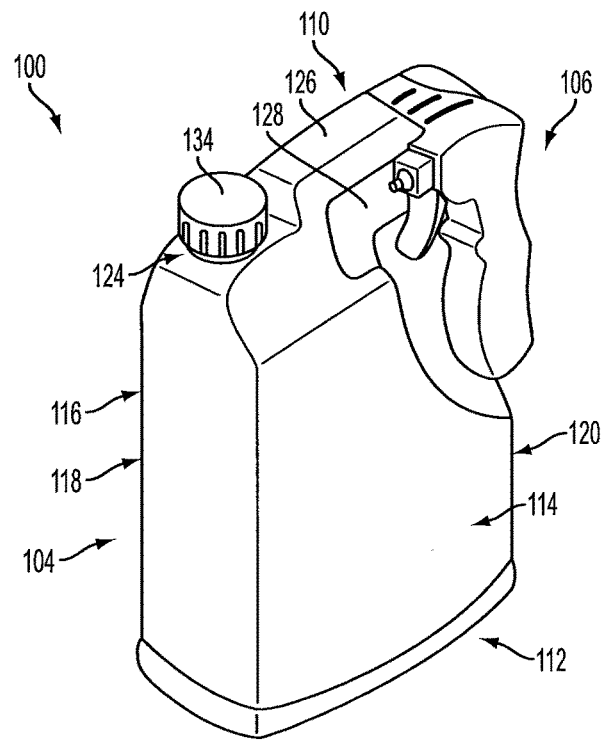
FIG. 1 is a perspective view of a dispensing assembly according to an example embodiment of the present disclosure.

Example embodiments of the present disclosure generally relate to dispensing assemblies, and to methods of making and using such dispensing assemblies. The dispensing assemblies can be used to dispense fluids (e.g., desired liquid formulations, etc.) at desired locations and to apply the fluids at desired targets such as, for example, unwanted pests, plants, etc.

The dispensing assemblies of the present disclosure generally include containers for holding the fluids, and sprayers for dispensing the fluids from the containers. Various sizes of containers may be used. And, various types of sprayers may be used (e.g., pump-type sprayers, piston-operated sprayers, powered sprayers (e.g., battery-powered sprayers, etc.), etc.).

In some aspects of the present disclosure, the sprayers are configured to couple to the containers, for example, for use in packaging the dispensing assemblies, shipping the dispensing assemblies, storing the dispensing assemblies, etc.

In some aspects of the present disclosure, the sprayers are configured to at least partly nest with the containers when coupled thereto. For example, walls of the containers may define recesses configured to receive (and allow for nesting of) the sprayers within the recesses when the sprayers are coupled to the containers. In one example embodiment, a front wall of a container defines a recess configured to receive a sprayer when the sprayer is coupled to the container (such that the sprayer nests generally within the front wall of the container). As part of this nesting feature, upper surfaces, portions, etc. of the sprayers may be disposed generally along, generally coplanar with, generally aligned with, etc. upper surfaces, portions, etc. of the containers when the sprayers are coupled to the containers. In addition, end (e.g., rearward end, forward end, etc.) surfaces, portions, etc. of the sprayers may be disposed generally along, generally coplanar with, generally aligned with, etc. end (e.g., rearward end, forward end, etc.) surfaces, portions, etc. of the containers when the sprayers are coupled to the containers. And further, the sprayers and the containers may be disposed within footprints of the containers and/or within perimeters defined by the containers when the sprayers are coupled to the containers.

In some aspects of the present disclosure, the sprayers may have clip portions configured to engage (e.g., resiliently engage, frictionally engage, engage based on gravity, etc.) the containers (e.g., handle portions of the containers, other portions of the containers, etc.) for coupling the sprayers to the containers. The clip portions may have shapes (e.g., L-shapes, shapes with lips, arcuate shapes, shapes with tabs, shapes configured to mate with the containers, etc.) configured to engage the containers.

In some aspects of the present disclosure, clip portions of the sprayers may include arms extending away from the sprayers and defining channels configured to receive at least part of the containers within the channels to couple the sprayers to the containers. The arms may extend at least partly around portions (e.g., handle portions, other portions, etc.) of the containers to thereby couple the sprayers to the containers. The arms may be monolithically formed with the sprayers, or the arms may be formed separately from the sprayers and attached thereto (e.g., welded to the sprayers, staked to the sprayers, frictionally coupled to the sprayers, releasably coupled to the sprayers, pivotally coupled to the sprayers, etc.). Further, in some aspects of the present disclosure, the containers may include grooves configured to receive at least part of the arms of the sprayers into the grooves when the sprayers are coupled to containers.

In some aspects of the present disclosure, clip portions of the sprayers may include ribs that help support and reinforce the clip portions. In addition, in some of these aspects, the ribs may be configured (e.g., sized, shaped, etc.) to engage a portion of the containers, when the sprayers are coupled to the containers, to help inhibit undesired movement (or play) of the sprayers relative to the containers.

In some aspects of the present disclosure, the containers may have handles located toward upper portions of the containers, and the arms of the sprayers may have shapes (e.g., L-shapes, shapes with lips, rounded shapes, etc.) configured to extend at least partly around the handles of the containers to thereby couple the sprayers to the containers. Further, in some aspects, the handles of the containers may include grooves configured to receive at least part of the arms of the sprayers into the grooves when the sprayers are coupled to containers.

In some aspects of the present disclosure, the containers may not include handles located toward upper portions of the containers. Here, the clip portions of the sprayers may be configured to engage (e.g., resiliently snap-fit to, etc.) other portions of the containers for coupling the sprayers to the containers. For example, the containers may be formed with other structure configured to receive the clip portions. And, the sprayers can thus be coupled to the containers such that upper portions of the sprayers are generally coplanar, aligned, etc. with upper portions of the containers. In addition, the sprayers may also be disposed within footprints of the containers and/or within perimeters defined by the containers when the sprayers are coupled to the containers.

Example embodiments will now be described more fully with reference to the accompanying drawings.

FIGS. 1-20 illustrate an example embodiment of a dispensing assembly 100 according to the present disclosure. The dispensing assembly 100 can be used in applications such as, for example, pest control, weed control, etc. In connection with such applications, the dispensing assembly 100 can be used in settings such as residential settings, commercial settings, etc. in and around homes, businesses, lawns, gardens, etc. And, any desired fluid may be used (e.g., dispensed, etc.) in connection with the dispensing assembly 100 including, for example, pesticides, herbicides, other liquid formulations, etc.

Figure 2:
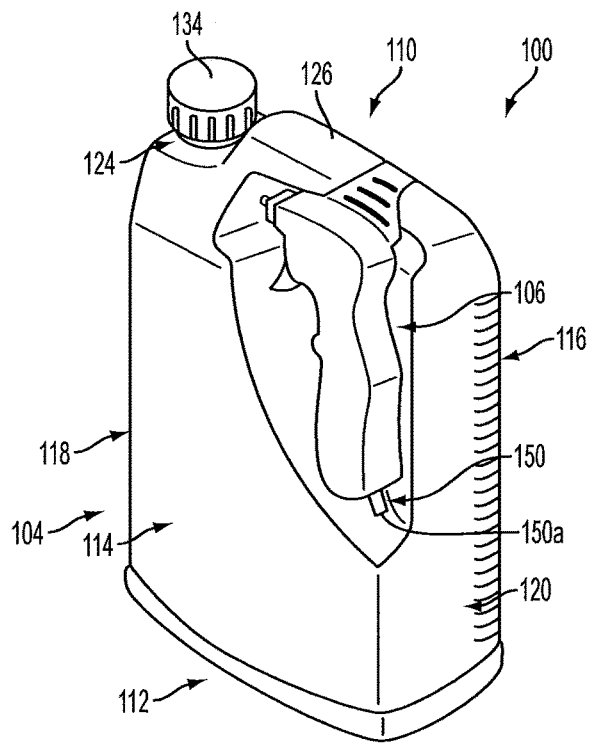
FIG. 2 is another perspective view of the dispensing assembly of FIG. 1.
Figure 3:
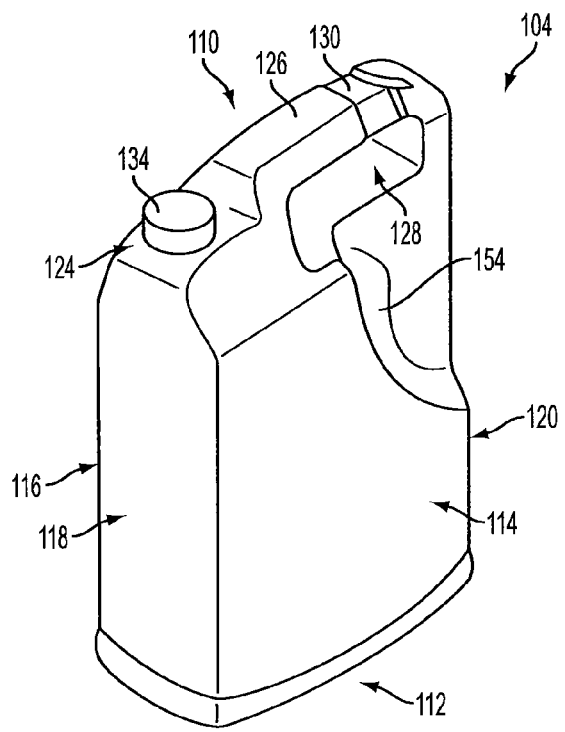
FIG. 3 is a perspective view of a container of the dispensing assembly of FIG. 1.
Figure 4:
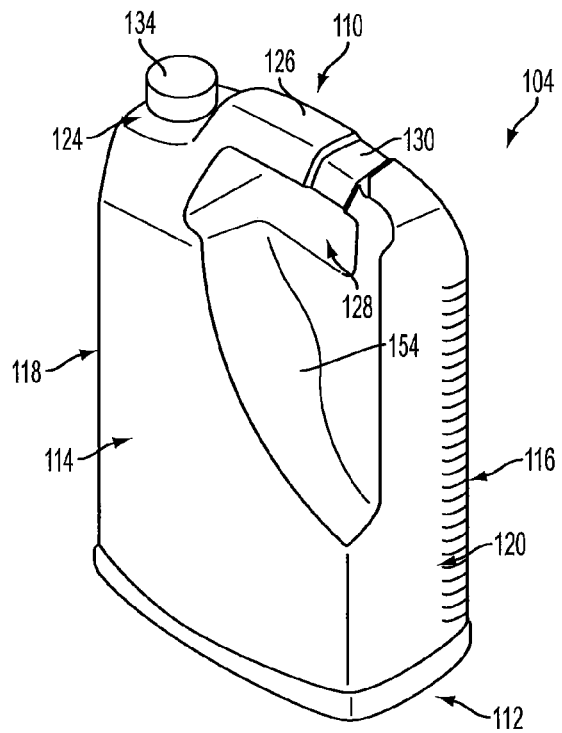
FIG. 4 is a perspective view of the container of FIG. 3.
Figure 5:
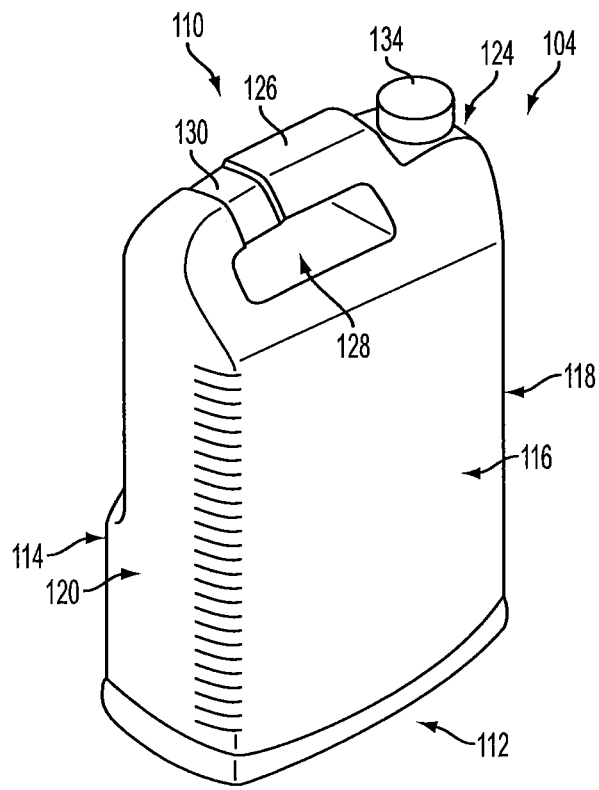
FIG. 5 is another perceptive view of the container of FIG. 3.
Figure 6:
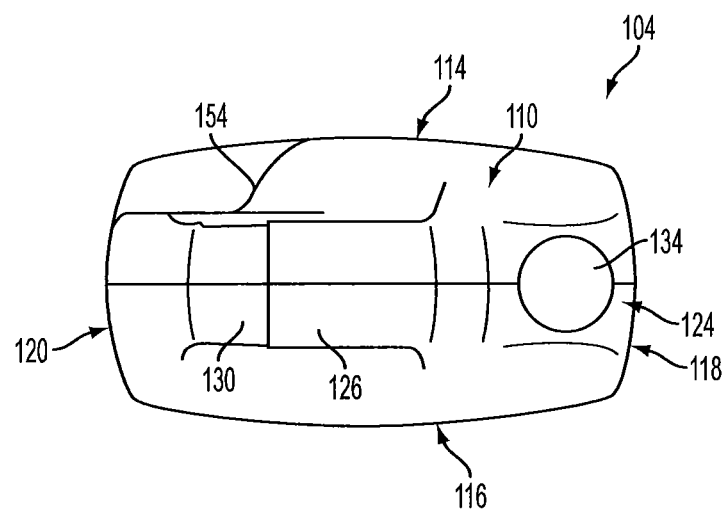
FIG. 6 is a top plan view of the container of FIG. 3.
Figure 7:
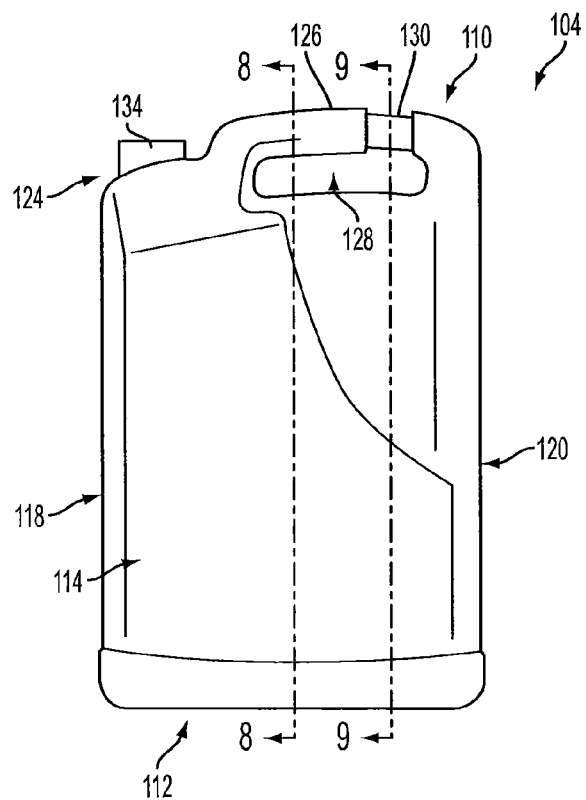
FIG. 7 is a front elevation view of the container of FIG. 3.
Figure 8:
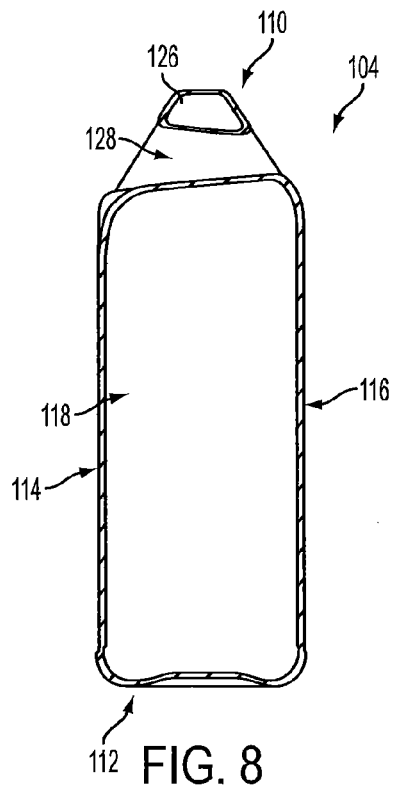
FIG. 8 is a section view of the container taken in a plane including line 8-8 in FIG. 7.
Figure 9:
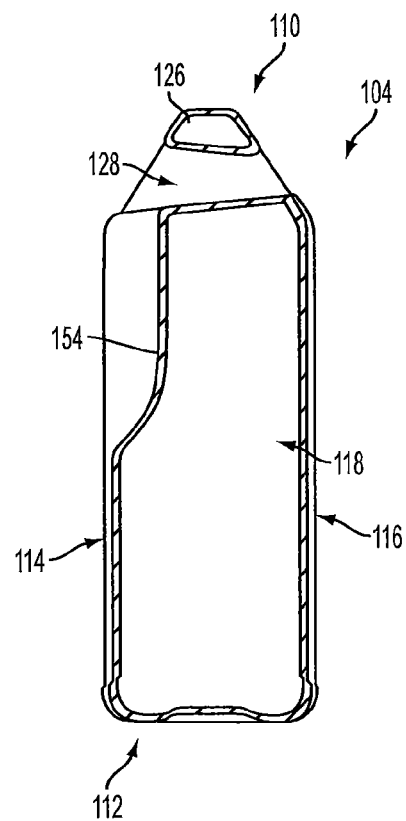
FIG. 9 is a section view of the container taken in a plane include line 9-9 in FIG. 7.
Figure 10:
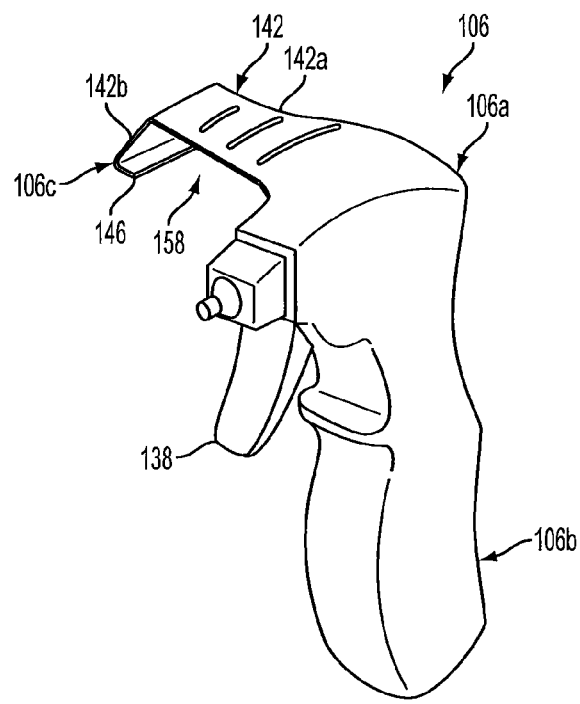
FIG. 10 is a perspective view of a sprayer of the dispensing assembly of FIG. 1.
Figure 11:
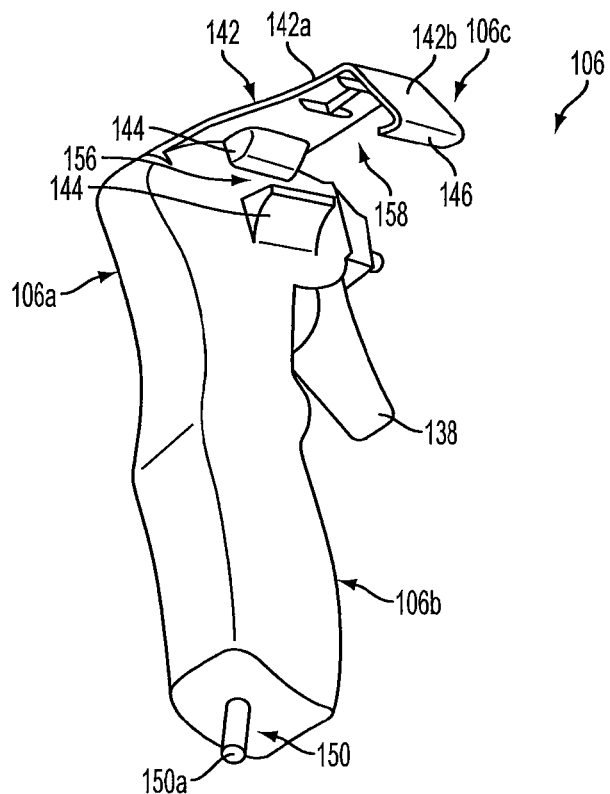
FIG. 11 is a perspective view of the sprayer of FIG. 10.
Figure 12:
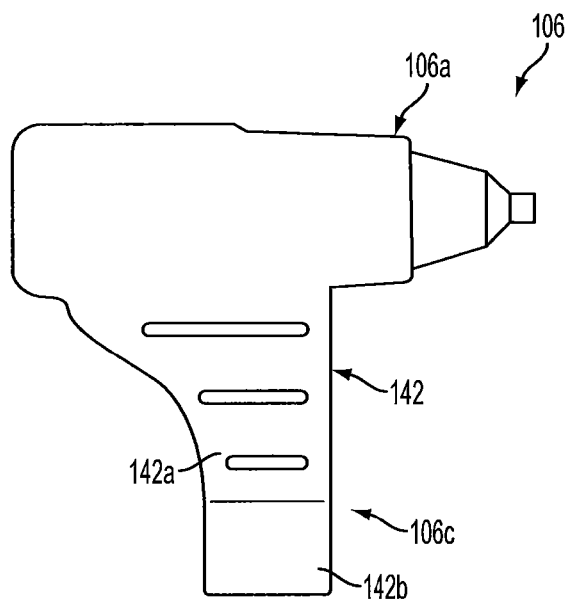
FIG. 12 is a top plan view of the sprayer of FIG. 10.
Figure 13:
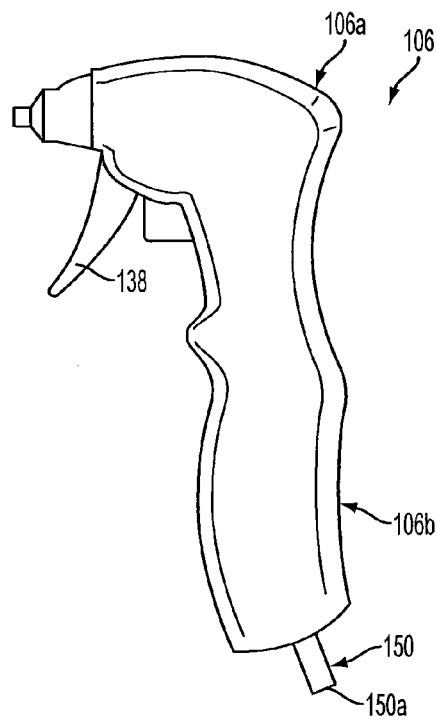
FIG. 13 is a front elevation view of the sprayer of FIG. 10.
Figure 14:
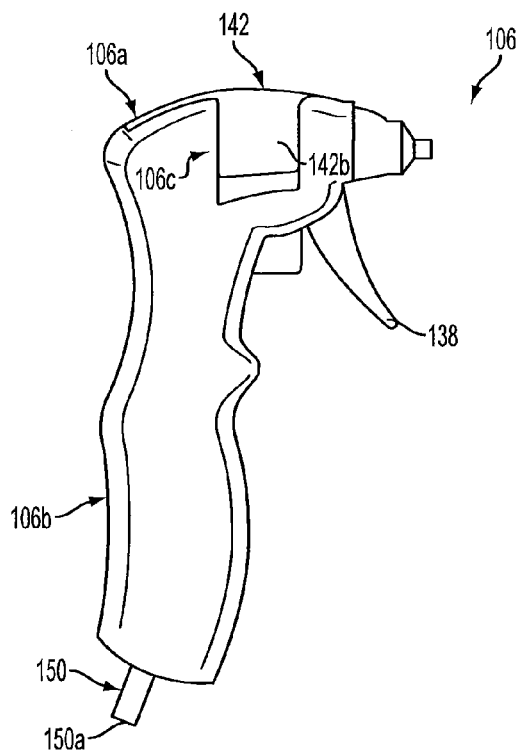
FIG. 14 is a rear elevation view of the sprayer of FIG. 10.
Figure 15:
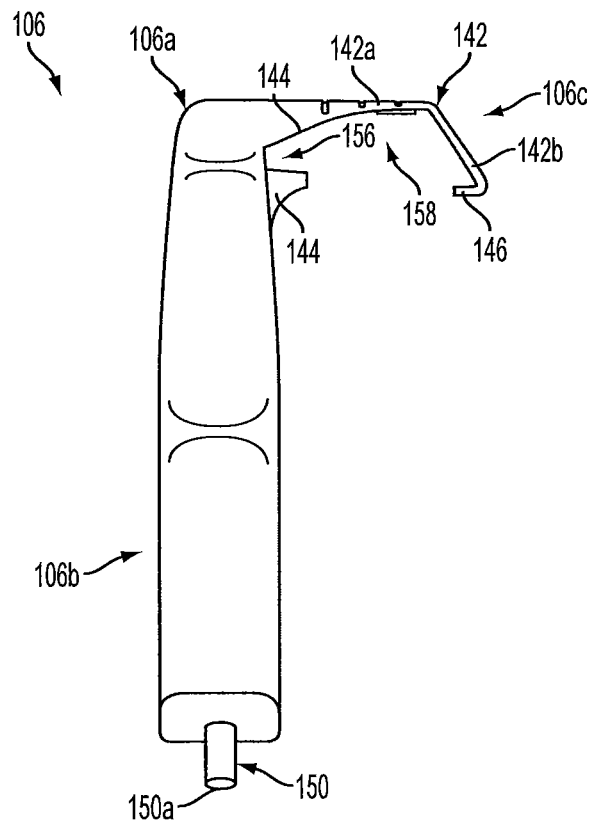
FIG. 15 is a side elevation view of the sprayer of FIG. 10.

As shown in FIGS. 1 and 2, the dispensing assembly 100 generally includes a container 104 and a sprayer 106. The container 104 is configured to hold fluid for use in the desired application of the dispensing assembly 100. And, the sprayer 106 is configured to draw fluid out of the container 104 for dispensing, applying, etc. the fluid at desired targets (e.g., unwanted insects, plants, etc.) associated with the application of the dispensing assembly 100.

The sprayer 106 of the illustrated dispensing assembly 100 can be selectively coupled to and uncoupled, removed, etc. from the container 104. For example, the sprayer 106 can be coupled (e.g., resiliently snap-fit, etc.) to the container 104 for commercial presentation (e.g., at the point of sale of the dispensing assembly 100, etc.), for storage, for transport, etc. of the dispensing assembly 100. Then, the sprayer 106 can be uncoupled from the container 104 when desired to dispense the fluid from the container 104 (via the sprayer 106). And, the sprayer 106 can then be recoupled (e.g., resiliently snap-fit, etc.) to the container 104 again for storage, transport, etc. This will be described in more detail hereinafter.

As shown in FIGS. 3-9, the container 104 of the illustrated dispensing assembly 100 includes an upper portion 110, a lower portion 112, generally opposing forward and rearward walls 114, 116, and generally opposing side walls 118, 120. The upper portion 110, the lower portion 112, and the walls 114, 116, 118, 120 define a volume within the container 104 for holding fluid. The container 104 can have any desired volume within the scope of the present disclosure, for example (and without limitation), a one-half gallon volume, a one gallon volume, etc. What's more, the container 104 can be formed from any suitable materials (e.g., plastics, polymeric resinous material such as high density polyethylene (HDPE), composite materials, etc.) and/or by any suitable processes (e.g., molding processes, etc.) within the scope of the present disclosure.

The upper portion 110 of the container 104 includes a spout 124 (broadly, an opening) and a handle 126. The spout 124 is in fluidic communication with the container 104 and is configured for receiving fluid into the container 104 and/or for use in dispensing fluid from the container 104. The handle 126 is configured for use in carrying the container 104 (and sprayer 106). The handle 126 extends generally horizontally along the upper portion 110 of the container 104, generally between the side wall 120 and the spout 124. An opening 128 is defined generally between the handle 126 and an upper surface of the container 104. The opening 128 is oriented such that, when a user grasps the handle 126, the user's hand and/or fingers can extend into the opening 128 and, if desired, around the handle 126. A groove 130 is provided around at least part of the handle 126 for use in coupling the sprayer 106 to the container 104 (as will be described in more detail hereinafter).

The container 104 also includes a cap 134 (broadly, a cover) removably coupled to the spout 124. The cap 134 allows for selectively covering and uncovering the spout 124 to selectively allow and inhibit access to the fluid in the container 104. In addition, the cap 134 is configured to fluidically couple the sprayer 106 to the container 104 (as will be described in more detail hereinafter). In the illustrated embodiment, the cap 134 is threaded onto the spout 124. However, in other example embodiments, dispensing assemblies may include caps that are coupled to spouts of containers differently, for example, press-fit onto the spouts, snap-fit onto the spouts, friction-fit onto the spouts, coupled to the spouts by fasteners, fixedly coupled to the spouts (e.g., molded as one piece with the spouts, welded to the spouts, coupled to the spouts via adhesives, etc.), etc.

With reference now to FIGS. 10-15, the sprayer 106 of the illustrated dispensing assembly 100 includes a head portion 106a, a handle portion 106b, and an actuator 138 (e.g., a trigger, etc.). The head portion 106a and the handle portion 106b are arranged in a pistol-style configuration, with the handle portion 106b contoured to receive a hand of a user and the actuator 138 located adjacent the handle portion 106b to receive a finger of the user's hand. As such, in use, a user can with one hand grasp the handle portion 106b of the sprayer 106 and position a finger on the actuator 138 for dispensing fluid from the container 104, and then with the other hand carry the container 104 via the handle 126. The user can then move the actuator 138 (e.g., pull the actuator 138 toward the handle portion 106b, pump the actuator 138, etc.) to thereby dispense fluid from the container 104. As such the dispensing assembly 100 can provide a mobile unit for a user to quickly and easily dispense fluid at desired targets. The sprayer 106 can include suitable valves and working mechanisms for dispensing (e.g., for drawing, sucking, etc.) fluid from the container 104 within the scope of the present disclosure. What's more, the sprayer 106 can be formed from any suitable materials (e.g., plastics, polymeric resinous material such as high density polyethylene (HDPE), composite materials, etc.) and/or by any suitable processes (e.g., molding processes, etc.) within the scope of the present disclosure. In other example embodiments, dispensing assemblies may include sprayers having head portions and handle portions arranged in configurations other than pistol-style configurations (e.g., head portions and handle portions arranged in generally linear configurations, etc.).

The sprayer 106 of the illustrated dispensing assembly 100 also includes a clip portion 106c located adjacent the head portion 106a for use in coupling the sprayer 106 to the container 104. The clip portion 106c includes an arm 142 extending laterally away from the head portion 106a, and ribs 144 disposed along a side surface of the head portion 106a (generally below the arm 142). The illustrated arm 142 is formed generally continuously with an upper surface of the head portion 106a and defines a generally L-shape. The L-shape arm 142 includes a first portion 142a that is generally coplanar, aligned, etc. with the upper surface of the head portion 106a and a second portion 142b extending generally downwardly from the first portion 142a. A free end of the first portion 142a is generally rounded, curved, etc. to form a lip 146. In the illustrated embodiment, the clip portion 106c is formed as one piece (e.g., monolithically, unitarily, etc.) with the head portion 106a. For example, the clip portion 106c may be molded as one piece with the head portion 106a. In other example embodiments, however, dispensing assemblies may include sprayers with clip portions formed separately from the sprayers and then subsequently attached thereto. In addition, in other example embodiments, dispensing assemblies may include sprayers with clip portions shaped and/or located differently than illustrated herein, but still configured to couple the sprayers to containers of the dispensing assemblies. Also in the illustrated embodiment, the second portion 142b of the arm 142 extends generally downwardly from the first portion 142a at an angle that is greater than about ninety degrees. In other example embodiments, dispensing assemblies may include sprayers with arms having second portions that extend downwardly from first portions at angles other than illustrated herein, for example, about ninety degrees, less than ninety degrees, etc.

The sprayer 106 of the illustrated dispensing assembly 100 further includes tubing 150 configured to fluidically couple the sprayer 106 to the container 104 for transporting fluid from the container 104 to the sprayer 106 (for dispensing). The tubing 150 extends through the handle portion 106b of the sprayer 106 and, at one end portion (not visible), operatively couples to the head portion 106a of the sprayer 106 (e.g., to valves, pumps, etc. in the sprayer 106). An opposite end portion 150a of the tubing 150 is then configured to selectively couple to the cap 134 of the container 104 (e.g., when desired to dispense fluid from the container 104, etc.). The tubing 150 is generally flexible. And, the flexibility of the tubing 150 permits the sprayer 106 to be moved in any direction relative to the container 104. With that said, the end portion 150a of the tubing 150 can couple to the cap 134 of the container 104 by any suitable operations. For example, as described in U.S. Pat. No. 5,469,993 (the entire disclosure of which is incorporated herein by reference), the cap 134 may include a dip tube (not shown) extending into the container 104 through the spout 124 and a nozzle (e.g., a spout, etc.) (not shown) in fluidic communication with the dip tube. The tubing 150 can then couple (e.g., via a connector on the end portion of the tubing 150, etc.) to the nozzle. The nozzle may then be configured to pivot between an open position in which fluid can be drawn out of the container 104 by the sprayer 106, and a closed position inhibiting such movement of the fluid (the tubing 150 may remain coupled to the nozzle, or the tubing 150 may be uncoupled from the nozzle as desired).

In the illustrated embodiment, the handle portion 106b of the sprayer 106 is generally hollow. As such, the tubing 150 can be positioned within the handle portion 106b when not in use (e.g., for storage, etc.). When desired to dispense fluid from the container 104 using the sprayer 106, the tubing 150 can then be removed from the handle portion 106b of the sprayer 106 and coupled to the container 104, via the cap 134, for providing fluid from the container 104 to the sprayer 106 through the tubing 150. After such use, the tubing 150 may be uncoupled from the cap 134 of the container 104 and repositioned within the handle portion 106b of the sprayer 106 (if desired). In other example embodiments, dispensing assemblies may include structure separate from sprayers of the dispensing assemblies for use in holding, receiving, storing, etc. tubing (e.g., compartments, containers, etc. formed on, coupled to, etc. containers of the dispensing assemblies).

FIGS. 16-20 illustrate the dispensing assembly 100 with the sprayer 106 coupled to the container 104. The sprayer 106 is disposed generally along the forward wall 114 of the container 104, generally within a recess 154 defined by the forward wall 114. The head portion 106a of the sprayer 106 is disposed adjacent the opening 128 of the container 104 (e.g., next to the opening 128 of the container 104, at least partly in the opening 128 of the container 104, at the same vertical level as the opening 128 of the container 104, etc.) and toward the side wall 120 of the container 104. The actuator 138 of the sprayer 106 is located generally above the recess 154, and at the same general level as the opening 128 of the container 104. A forward portion of the handle 126 is received within a channel 156 defined by the ribs 144 of the sprayer 106. And, the arm 142 of the sprayer 106 is positioned over the handle 126, generally within the groove 130 of the handle 126, with the handle 126 generally received within a channel 158 defined by the arm 142. In this position, the generally first portion 142a of the arm 142 is disposed along an upper portion of the handle 126, the generally second portion 142b of the arm 142 is disposed along a rearward portion of the handle 126, and the lip 146 of the arm 142 is disposed generally under the handle 126. In the illustrated embodiment, the arm 142 of the sprayer 106 is resiliently flexible to accommodate positioning (and repeated repositioning) of the arm 142 over (and partly around) the handle 126 (e.g., for repeated removal and reattachment of the sprayer 106 to the handle 126 of the container 104, etc.). As such, the sprayer 106 (via the arm 142) is resiliently snap fit onto the handle 126 of the container 104 in the illustrated embodiment. Further, the weight of the sprayer 106 combined with the offset positioning of the arm 142 (together with the snap fit coupling of the sprayer 106 onto the handle 126 of the container 104) may help hold (e.g., via a counterbalance effect, etc.) the sprayer on the container 104. In other example embodiments, dispensing assemblies may include sprayers and containers where the weight of the sprayers combined with offset positioning of arms on the sprayers help hold the sprayers on the containers (e.g., with the arms of the sprayers positioned at least partly over portions of the containers and independent of snap fit couplings of the sprayers onto the containers, etc.).

To uncouple the sprayer 106 from the container 104, the arm 142 of the sprayer 106 can be biased to release the lip 146 from under the handle 126. The sprayer 106 can then be pivoted off the handle 126 to move the entire arm 142 out of the groove 130 of the handle 126. Alternatively, the sprayer 106 can be initially pivoted away from the forward wall 114 of the container 104 to release the handle 126 from the channel 156 defined by the ribs 144 of the sprayer 106. And, the arm 142 of the sprayer 106 can then be manipulated to release the lip 146 from under the handle 126.

As previously stated, in other example embodiments, dispensing assemblies may include sprayers with clip portions shaped and/or located differently than illustrated herein. For example, dispensing assemblies may include sprayers having clip portions with arms having shapes other than L-shapes (e.g., C-shapes, etc.), but that are still configured to couple (e.g., snap-fit, etc.) the sprayers to handles of containers of the dispensing assemblies. Also for example, dispensing assemblies may include sprayers having clip portions with arms that define shapes that generally correspond to shapes of handles of containers to which the sprayers are to be releasably coupled.

In the illustrated embodiment, the clip portion 106c of the sprayer 106 resiliently snap-fits to the handle 126 of the container 104. This allows for quick coupling and uncoupling of the sprayer 106 to and from the handle 126 of the container 104. In addition, the clip portion 106c provides a generally self-contained attachment means of the sprayer 106 to the container 104. Additional fasteners are not required to couple the sprayer 106 to the container 104. Further, the clip portion 106c securely couples the sprayer 106 to the container 104 against inadvertent removal such that, in preparation for initial shipping and sale of the dispensing assembly 100, additional securing means (e.g., adhesive such as glue and tape, mechanical straps, shrink wrap, etc.) are not required for securing the sprayer 106 to the container 104.

Figure 16:
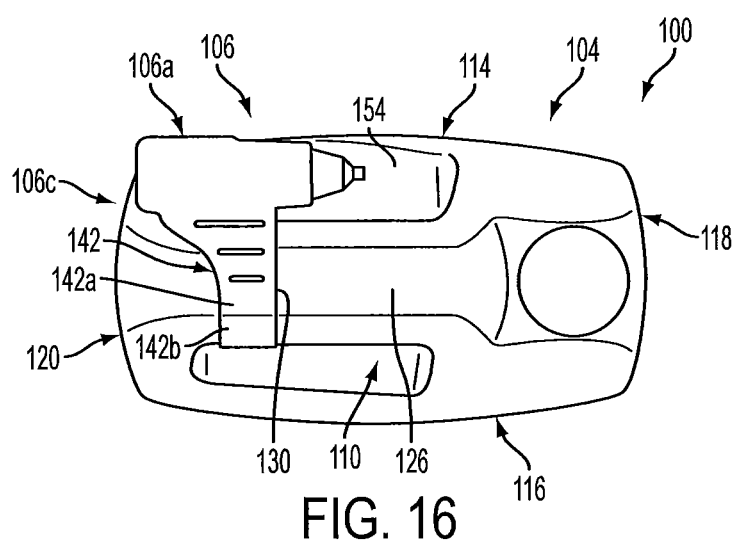
FIG. 16 is a top plan view of the dispensing assembly of FIG. 1.
Figure 17:
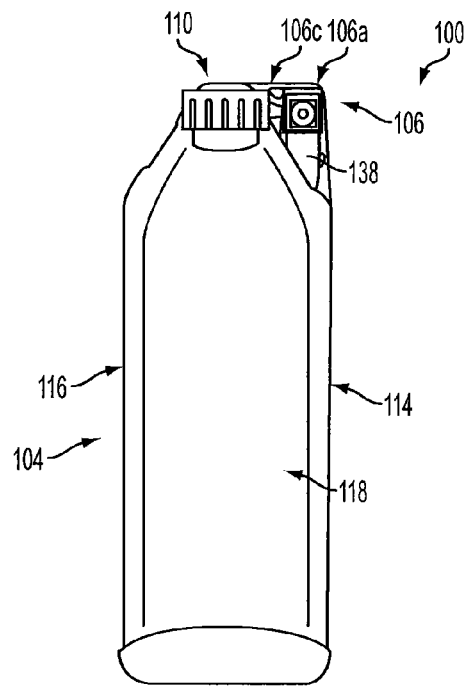
FIG. 17 is a side elevation view of the dispensing assembly of FIG. 1.
Figure 18:
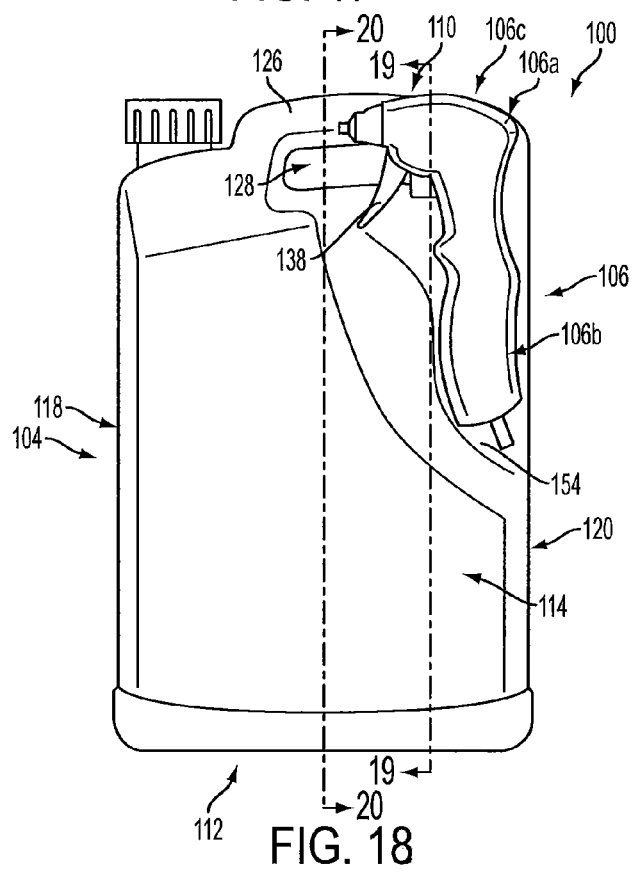
FIG. 18 is a front elevation view of the dispensing assembly of FIG. 1.
Figure 19:
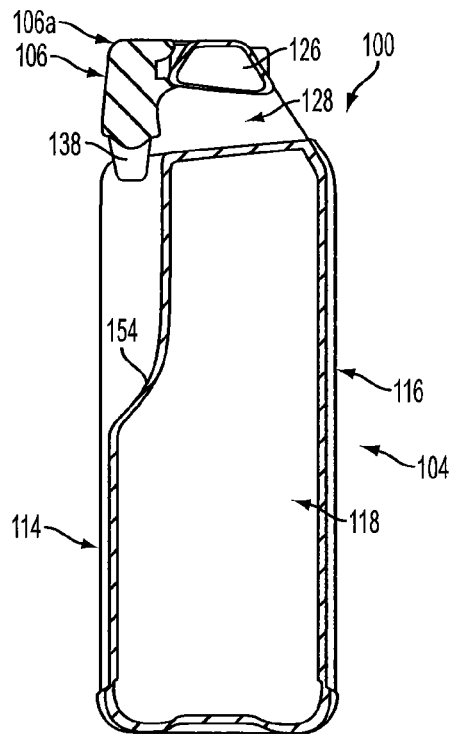
FIG. 19 is a section view of the dispensing assembly taken in a plane including line 19-19 in FIG. 18.
Figure 20:
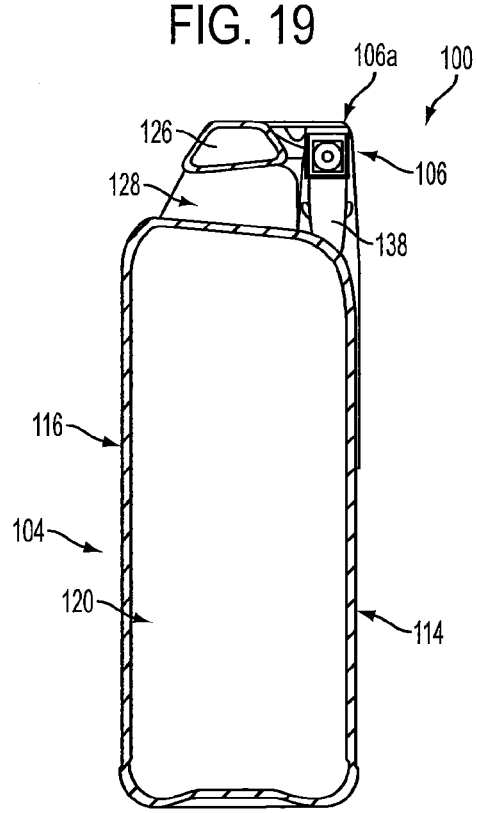
FIG. 20 is a section view of the dispensing assembly taken in a plane including line 20-20 in FIG. 18.

Also in the illustrated embodiment, the sprayer 106 is coupled to the container 104 generally within a footprint defined by the container 104 (see, e.g., FIG. 15, etc.), and generally within a perimeter defined by the upper portion 110, lower portion 112, and walls 114, 116, 118, 120 of the container 104 (see, e.g., FIGS. 16 and 17, etc.). The recess 154 defined by the forward wall 114 of the container 104 is configured to accommodate and receive substantially the entire sprayer 106 (e.g., the sprayer 106 nests within the recess 154 against the forward wall 114 of the container 104, etc.). As such, a forward side surface of the sprayer 106 is generally flush with a non-recessed surface portion of the forward wall 114. In addition, an upper surface of the head portion 106a and clip portion 106c of the sprayer 106 are generally flush, coplanar, etc. with the upper surface of the handle 126. And, a right side surface (as viewed in FIG. 18) of the sprayer 106 is generally flush with the side wall 120 of the container 104. Thus, the sprayer 106 occupies no additional shelf space or box space than the container 104 would without the sprayer 106, which can allow the dispensing assembly 100 to be compactly boxed, stored, shipped, displayed, etc.

Also in the illustrated embodiment, the sprayer 106 is coupled to the handle 126 of the container 104 toward the upper portion of the container 104. As such, the recess 154 defined by the forward wall 114 of the container 104 is positioned generally higher on the container 104 which provides more volume within the container 104 below the recess 154 (as compared to other known containers). As a result, the overall depth of the container 104 (extending between the forward wall 114 and rearward wall 116) can be reduced without decreasing a total volume of the container 104. For example, the depth of the container 104 may be reduced by at least about 0.25 inches or more without decreasing the total volume of the container 104. In turn, the footprint of the container 104 can be reduced without decreasing the total volume of the container 104. What's more, the actuator 138 of the sprayer 106 is located generally above the recess 154, such that the recess can have a generally generic shape without having to specifically accommodate the actuator 138.

Further in the illustrated embodiment, the sprayer 106 is coupled to the container 104 along the forward wall 114 of the container 104. This positions the sprayer 106 in an immediately visible location to users (e.g., consumers, etc.) considering the dispensing assembly 100. As such, the sprayer 106 (e.g., the type of the sprayer 106, the size of the sprayer 106, etc.) can be readily considered by consumers viewing the dispensing assembly 100 on a shelf at a retail location in deciding to purchase the dispensing assembly 100.

The dispensing assembly 100 of the illustrated embodiment further provides a ready to use system for dispensing fluid. For example, the dispensing assembly 100 can be provided to a user with a premixed ready to spray liquid formulation in the container 104 and the sprayer 106 coupled to the container 104 ready for use to dispense the liquid formulation from the container 104. The sprayer 106 is simply uncoupled from the container 104, and the tubing 150 then coupled to the cap 134 of the container 104. The actuator 138 of the sprayer 106 can then be moved to draw fluid out of the container 104 for discharge onto desired targets. As such, the dispensing assembly 100 is shelf ready (e.g., ready for retailers to place on shelves for sale to consumers and ready for immediate use by consumers, etc.).

Figure 21:
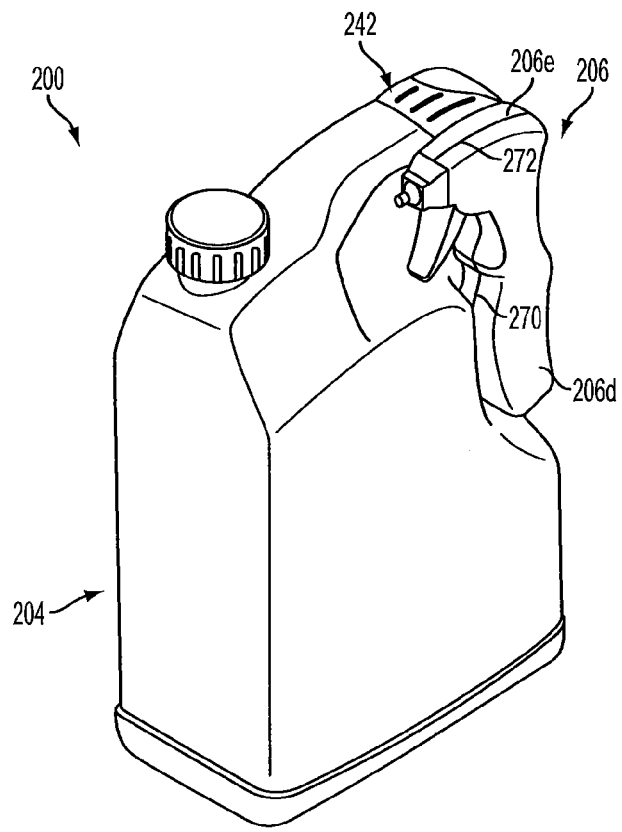
FIG. 21 is a perspective view of a dispensing assembly according to another example embodiment of the present disclosure.
Figure 22:
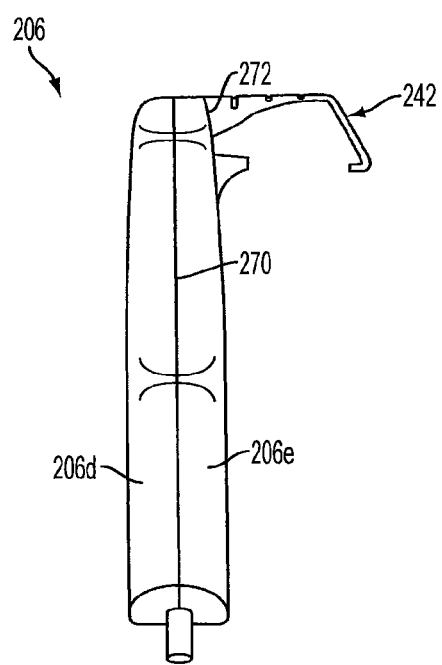
FIG. 22 is a side elevation view of a sprayer of the dispensing assembly of FIG. 21.
Figure 23:
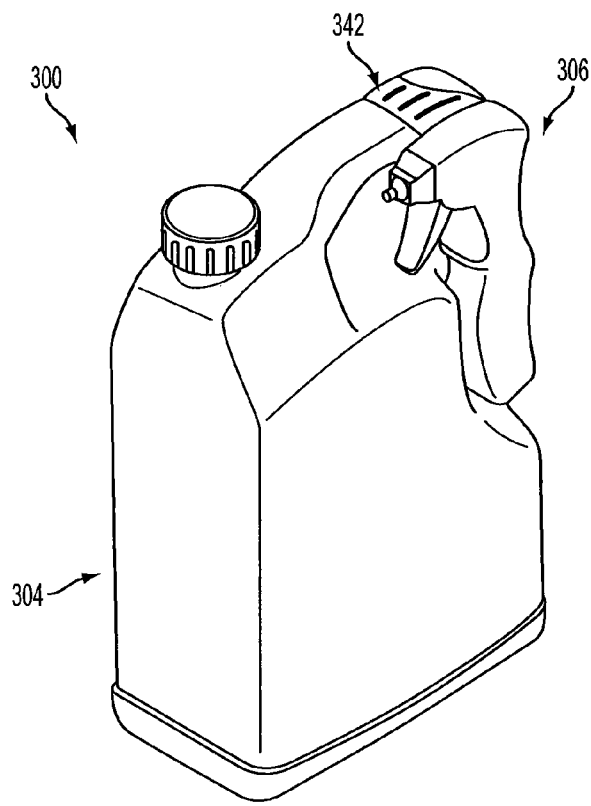
FIG. 23 is a perspective view of a dispensing assembly according to another example embodiment of the present disclosure.
Figure 24:
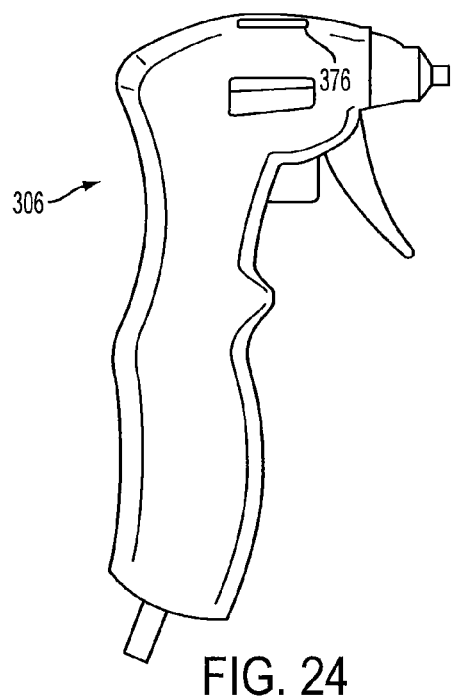
FIG. 24 is a rear elevation view of a sprayer of the dispensing assembly of FIG. 23.
Figure 25:
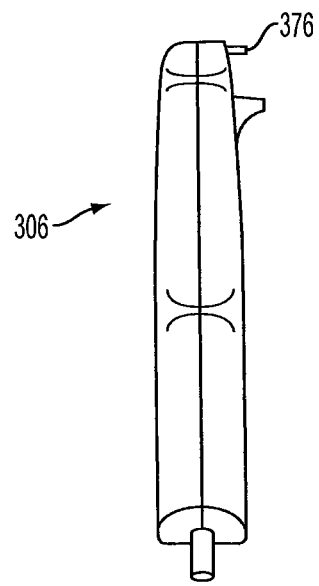
FIG. 25 is a side elevation view of the sprayer of the dispensing assembly of FIG. 23.
Figure 26:
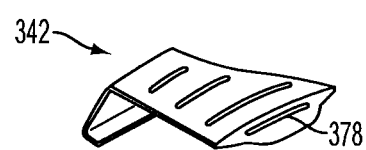
FIG. 26 is a perspective view of an arm of the sprayer of the dispensing assembly of FIG. 23.
Figure 27:
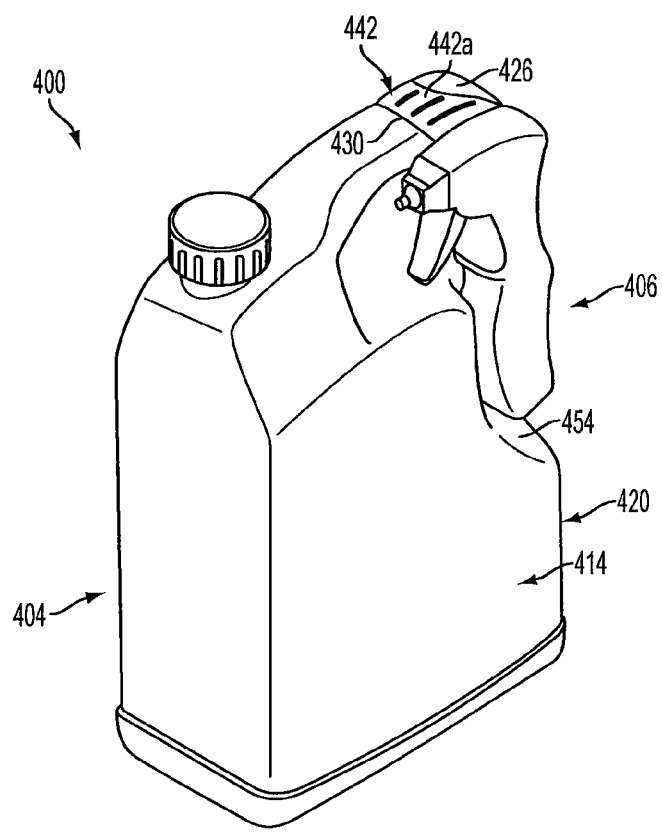
FIG. 27 is a perspective view of a dispensing assembly according to another example embodiment of the present disclosure.
Figure 28:
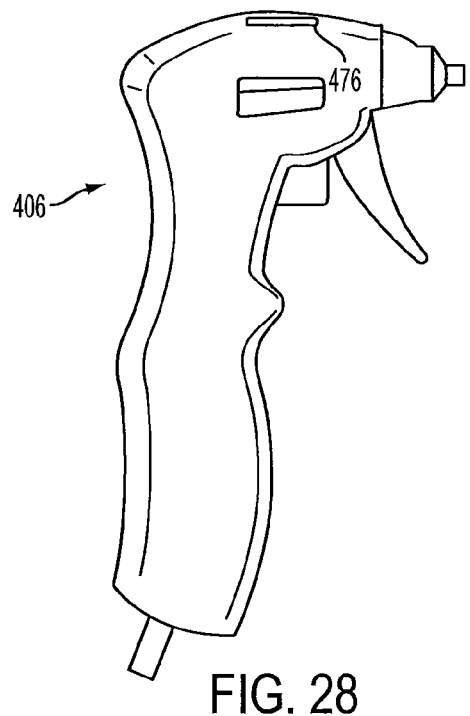
FIG. 28 is a rear elevation view of a sprayer of the dispensing assembly of FIG. 27.
Figure 29:
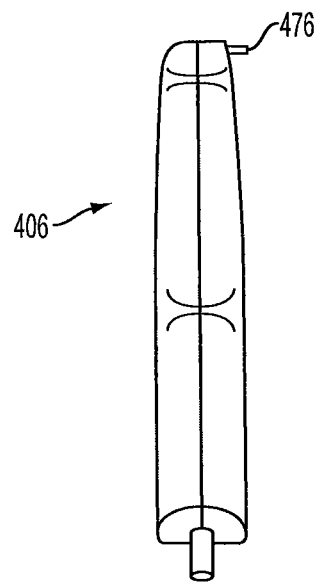
FIG. 29 is a side elevation view of the sprayer of the dispensing assembly of FIG. 27.
Figure 30:
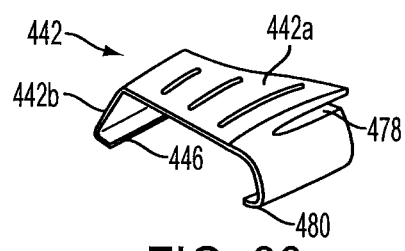
FIG. 30 is a perspective view of an arm of the sprayer of the dispensing assembly of FIG. 27.

FIGS. 21 and 22 illustrate another example embodiment of a dispensing assembly 200 according to the present disclosure. The dispensing assembly 200 is substantially similar to the dispensing assembly 100 illustrated in FIGS. 1-20. For example, the dispensing assembly 200 generally includes a container 204 and a sprayer 206. And, the sprayer 206 is configured to couple to the container 204 (in similar fashion to that previously described for the dispensing assembly 100). In this embodiment, however, the sprayer 206 includes separate first and second body portions 206d, 206e, as well as a separate arm 242. The first and second body portions 206d, 206e are coupled (e.g., welded, etc.) together along joint 270, and the arm 242 is coupled (e.g., welded, etc.) to the second body 206e portion along joint 272. As such, in this example embodiment, the arm 242 can be formed separate from the body portions 206d, 206e of the sprayer 206 and subsequently coupled thereto as desired (e.g., when assembling the sprayer 206, when assembling the dispensing assembly 200, etc.). With that said, it should be appreciated that the body portions 206d, 206e of the sprayer 206 and the arm 242 of the sprayer 206 can be formed from any suitable process (e.g., a molding process, etc.).

FIGS. 23-26 illustrate another example embodiment of a dispensing assembly 300 according to the present disclosure. The dispensing assembly 300 of this embodiment is substantially similar to the dispensing assembly 100 illustrated in FIGS. 1-20. For example, the dispensing assembly generally includes a container 304 and a sprayer 306. And, the sprayer 306 is configured to couple to the container 304 (in similar fashion to that previously described for the dispensing assembly 100). In this embodiment, however, the sprayer 306 includes an arm 342 formed separate from the sprayer 306 and coupled thereto. In particular, the sprayer 306 includes a tab 376 formed along an upper side portion of the sprayer 306, and the arm 342 includes a recess 378. The recess 378 of the arm 342 is configured to fit over the tab 376 of the sprayer 306, such that the arm 342 can be press-fit (e.g., compression fit, resistance fit, friction fit, etc.)

onto the sprayer 306. Thus, in this embodiment, the arm 342 can again be formed separate from the sprayer 306 and subsequently coupled thereto as desired (e.g., when assembling the sprayer 306, when assembling the dispensing assembly 300, etc.). It should be appreciated that the sprayer 306 and the arm 342 of the sprayer 306 can be formed from any suitable process (e.g., a molding process, etc.). In some aspects of the present disclosure, the arm 342 may be further secured to the sprayer 306 by additional means (e.g., heat stake, welds (e.g., sonic welds, etc.), adhesive (e.g., glue, etc.), mechanical fasteners, etc.). In these aspects, the tab 376 of the sprayer 306 and the recess 378 of the arm 342 also operate to help align the arm 342 on the sprayer 306 prior to securing the arm 342 to the sprayer 306 via the additional means.

In other example embodiments, dispensing assemblies may include sprayers similar to the sprayer 306 of the dispensing assembly 300, but where arms of the sprayers include tabs and where the sprayers include recesses configured to receive the tabs of the arms for use in press-fitting the arms onto the sprayers. As such, it should be appreciated that any desired combination and/or any desired number of mating components (e.g., male/female components, etc.) could be used with sprayers and arms for coupling them together within the scope of the present disclosure, for example, tabs, recesses, nubs, openings, notches, flanges, flanges with lips, etc. What's more, the mating components may have any suitable configuration (e.g., horizontal flanges configured to be received in corresponding openings, L-shaped flanges configured to be received in corresponding openings, nubs configured to be received in corresponding openings, pins configured to be received in corresponding openings, protrusions configured to be received in corresponding recesses, etc.). Still further, the mating components may also operate to help align the arms with the sprayers when coupling them together (with additional means (as described herein) then also used to help secure the arms to the sprayers).

In one example embodiment, a dispensing assembly includes a sprayer with an arm having a flange extending generally downwardly at an angle (e.g., about ninety degrees, greater than about ninety degrees, less than about ninety degrees, etc.) from the arm. And, the sprayer includes an opening (e.g., in a side surface of the sprayer, etc.) configured to receive (e.g., to hook, etc.) the flange therein (e.g., in a nesting fashion, etc.) for use in coupling the arm to the sprayer. In some aspects, the arm may then be further secured to the sprayer 306 by additional means (e.g., heat stake, welds (e.g., sonic welds, etc.), adhesive (e.g., glue, etc.), mechanical fasteners, etc.).

In another example embodiment, a dispensing assembly includes a sprayer with an arm having a flange extending generally outwardly from an upper surface of the arm (e.g., such that the flange is generally coplanar with the upper surface of the arm, etc.). And, the sprayer includes a notch opening (e.g., in an upper surface of the sprayer, etc.) configured to receive the flange therein (e.g., in a nesting fashion, etc.) for use in coupling the arm to the sprayer. In some aspects, the arm may then be further secured to the sprayer 306 by additional means (e.g., heat stake, welds (e.g., sonic welds, etc.), adhesive (e.g., glue, etc.), mechanical fasteners, etc.).

In another example embodiment, a dispensing assembly includes a sprayer with an arm having a flange extending generally away from the arm. And, the sprayer includes an opening (e.g., in a side surface of the sprayer, in an upper surface of the sprayer, etc.) configured to receive the flange therein for use in coupling the arm to the sprayer. The flange of the arm includes protrusions (e.g., dimples, tabs, etc.), and the opening of the sprayer includes corresponding recesses, voids, etc. defined therein for receiving the protrusions to thereby provide a snap-fit coupling between the arm and the sprayer (e.g., a permanent snap-fit coupling, a releasable snap-fit coupling, etc.) when the flange is received in the opening. In some aspects, the arm may then be further secured to the sprayer 306 by additional means (e.g., heat stake, welds (e.g., sonic welds, etc.), adhesive (e.g., glue, etc.), mechanical fasteners, etc.) if desired.

FIGS. 27-30 illustrate another example embodiment of a dispensing assembly 400 according to the present disclosure. The dispensing assembly 400 of this embodiment is again substantially similar to the dispensing assembly 100 illustrated in FIGS. 1-20. For example, the dispensing assembly 400 generally includes a container 404 and a sprayer 406. And, the sprayer 406 is configured to couple to the container 404.

In this embodiment, the sprayer 406 includes an arm 442 releasably coupled to the sprayer 406. In particular, a tab 476 is formed along an upper side portion of the sprayer 406, and a slot 478 is formed in an end portion of the arm 442. The slot 478 of the arm 442 is configured (e.g., keyed, etc.) to receive (e.g., slide over, etc.) the tab 476 of the sprayer 406 to thereby releasably couple the arm 442 to the sprayer 406. Thus, in this embodiment, the arm 442 can again be formed separate from the sprayer 406 and subsequently coupled thereto as desired (e.g., when assembling the sprayer 406, when assembling the dispensing assembly 400, etc.). The sprayer 406 and the arm 442 of the sprayer 406 can again be formed from any suitable process (e.g., a molding process, etc.). In other example embodiments, dispensing assemblies may include sprayers similar to the sprayer 406 of the dispensing assembly 400, but where arms of the sprayers include tabs and where the sprayers include slots configured to receive the tabs of the arms for use in releasably coupling the arms to the sprayers. What's more, it should be appreciated that the tabs and the slots can have any desired configurations (e.g., any desired keyed configurations such as, for example, tongue-and-groove configurations, etc.) within the scope of the present disclosure.

The sprayer 406 initially couples to the container 404 (e.g., when initially assembling the dispensing assembly 400, etc.) by positioning the arm 442 (which is already coupled to the sprayer 406) over a handle 426 of the container 404 and within a groove 430 provided around at least part of the handle 426. The arm 442 is resiliently flexible to provide a snap-fit coupling of the arm over (and at least partly around) the handle 426. A generally first portion 442a of the arm 442 is disposed along an upper portion of the handle 426. A generally second portion 442b of the arm 442 is disposed along a rearward portion of the handle 426. A first lip 446 of the arm 442 is disposed generally under the handle 426. And, a second lip of the arm 442 is disposed along a forward portion of the handle 426. In addition, the sprayer 406 is positioned within a recess 454 defined by the container 404. A forward side surface of the sprayer 406 is generally flush with a non-recessed surface portion of a forward wall 414, an upper surface of the sprayer 406 is generally flush, coplanar, etc. with an upper surface of the handle 426, and a right side surface (as viewed in FIG. 27) of the sprayer 406 is generally flush with a side wall 420 of the container 404.

In use, to uncouple the sprayer 406 from the container 404, the sprayer 406 is separated from the arm 442 by moving the tab 476 of the sprayer 406 out of the slot 478 of the arm 442. The arm 442 remains coupled to the handle 426 of the container 404. Then, to recouple the sprayer 406 to the container 404, the tab 476 of the sprayer 406 is positioned (e.g., slid, etc.) back within the recess 478 of the arm 442.

Figure 31:
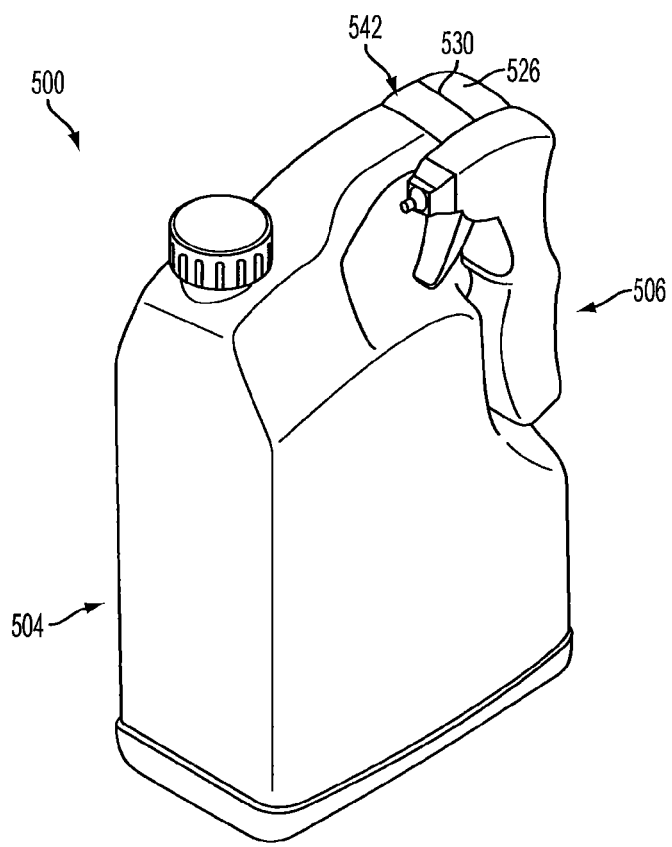
FIG. 31 is a perspective view of a dispensing assembly according to another example embodiment of the present disclosure.
Figure 32:
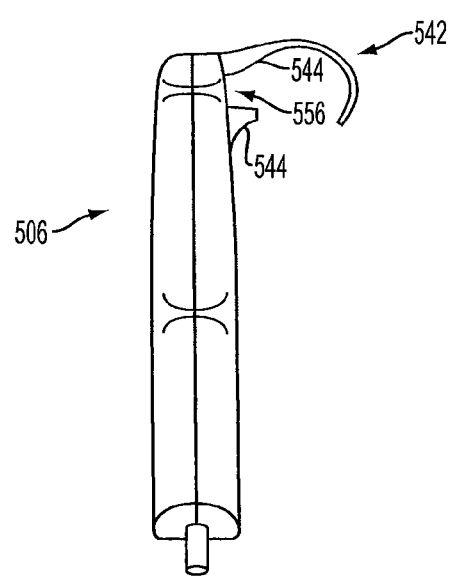
FIG. 32 is a side elevation view of a sprayer of the dispensing assembly of FIG. 31.

FIGS. 31 and 32 illustrate another example embodiment of a dispensing assembly 500 according to the present disclosure. The dispensing assembly 500 is substantially similar to the dispensing assembly 100 illustrated in FIGS. 1-20. For example, the dispensing assembly 500 generally includes a container 504 and a sprayer 506. And, the sprayer 506 is configured to couple to the container 504. In this embodiment, however, the sprayer 506 includes an arm 542 with a generally arcuate shape. The arm 542 can be formed as one piece with the sprayer 506, or the arm 542 can be formed separate from the sprayer 506 and coupled thereto within the scope of the present disclosure. In addition, the arm 542 may be resiliently flexible to help provide a friction fit between the arm 542 and the handle 526 (to thereby help hold the sprayer 506 on the container 504). In use, the sprayer 506 couples to the container 504 by positioning the arm 542 over a handle 526 of the container 504 (e.g., within a groove 530 provided around at least part of the handle 526, etc.). In this position, a forward portion of the handle 526 is received within a channel 556 defined by ribs 544 of the sprayer 506. The arm 542 may be resiliently flexible to help provide a friction fit between the arm 542 and the handle 526 (to thereby help hold the sprayer 506 on the container 504). Further, the weight of the sprayer 506 (combined with the offset positioning of the arm 542) may also help hold the sprayer 506 on the container 504. Ribs may be provided along the arm 542 and/or along the sprayer 506 to help reinforce the arm 542, for example, when flexing the arm 542 to couple the sprayer 506 to the container 504, etc.

Figure 33:
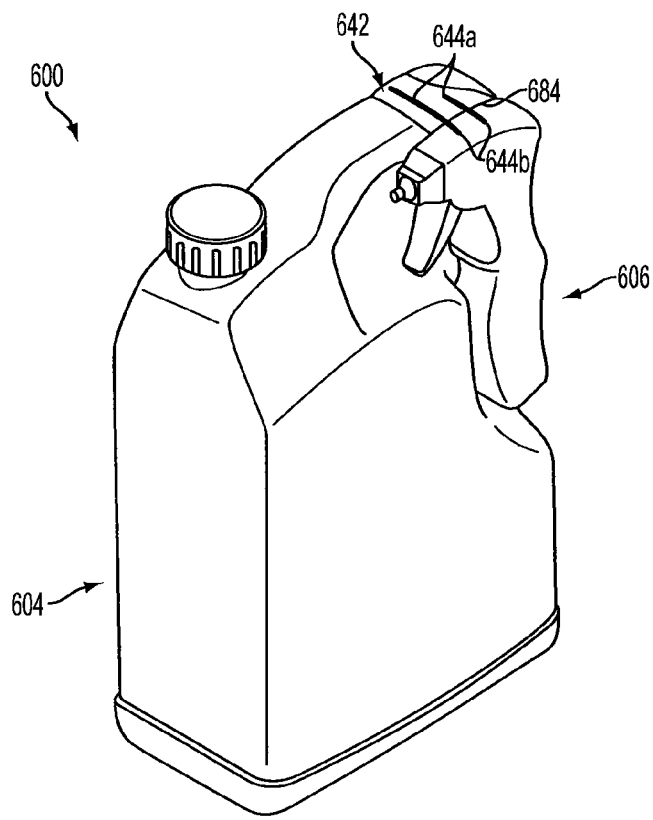
FIG. 33 is a perspective view of a dispensing assembly according to another example embodiment of the present disclosure.
Figure 34:
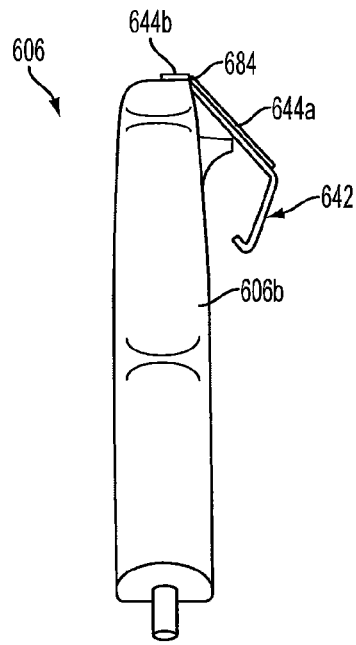
FIG. 34 is a side elevation view of a sprayer of the dispensing assembly of FIG. 33 with an arm of the sprayer shown folded generally downwardly.
Figure 35:
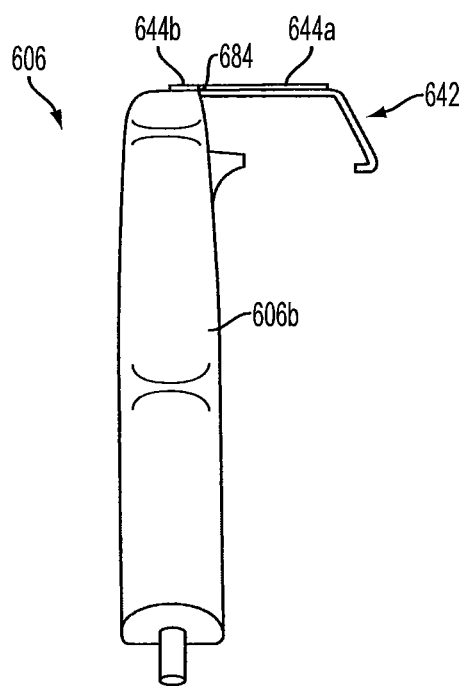
FIG. 35 is a side elevation view of the sprayer of the dispensing assembly of FIG. 33 with the arm of the sprayer shown folded generally upwardly for use in coupling the sprayer to the container.

FIGS. 33-35 illustrate another example embodiment of a dispensing assembly 600 according to the present disclosure. The dispensing assembly 600 is substantially similar to the dispensing assembly 100 illustrated in FIGS. 1-20. For example, the dispensing assembly 600 generally includes a container 604 and a sprayer 606. And, the sprayer 606 is configured to couple to the container 604 (in similar fashion to that previously described for the dispensing assembly 100). In this embodiment, the sprayer 606 includes an arm 642 pivotally coupled to the sprayer 606 along hinge 684. The arm 642 can be formed as one piece (e.g., monolithically, etc.) with the sprayer 606 such that the hinge 684 is a living hinge coupling the arm 642 to the sprayer 606. Or, the arm 642 can be formed separate from the sprayer 606 and pivotally coupled thereto via the hinge 684 (e.g., using a piano hinge, etc.). Ribs 644a are formed along an upper portion of the arm 642. And, corresponding ribs 644b are formed along an upper portion of the sprayer 606 which are configured to abut the ribs 644a of the arm 642 when the arm 642 is pivoted upward into position for coupling the sprayer 606 to the container 604. The arm 642 and/or container 604 may further include structure (e.g., tabs, etc.) that operate to secure the arm 642 in the position for coupling the sprayer 606 to the container 604 (e.g., upon pivoting the arm 606 upward, etc.).

Thus, in this embodiment, the sprayer 606 can be initially formed with the arm 642 positioned generally downward (e.g., adjacent a handle portion 606b of the sprayer 606, etc.) and not extended (e.g., for shipping, etc.) (FIG. 34). The arm 642 can then be extended, for example, when assembling the dispensing assembly 600 so that the sprayer 606 can be coupled to the container 604 (FIG. 35). It should be appreciated that the arm 642 of the sprayer 606 can have any desired shape within the scope of the present disclosure such as, for example, an L-shape as illustrated in FIGS. 33-35, a C-shape, etc.

FIGS. 36-43 illustrate another example embodiment of a dispensing assembly 700 according to the present disclosure. The dispensing assembly 700 is substantially similar to the dispensing assembly 100 illustrated in FIGS. 1-20. And, the dispensing assembly 700 can be used in applications such as, for example, pest control, weed control, etc. In connection with such applications, the dispensing assembly 700 can be used in settings such as residential settings, commercial settings, etc. in and around homes, businesses, lawns, gardens, etc. And, any desired fluid may be used (e.g., dispensed, etc.) in connection with the dispensing assembly 700 including, for example, pesticides, herbicides, other liquid formulations, etc.

Figure 36:
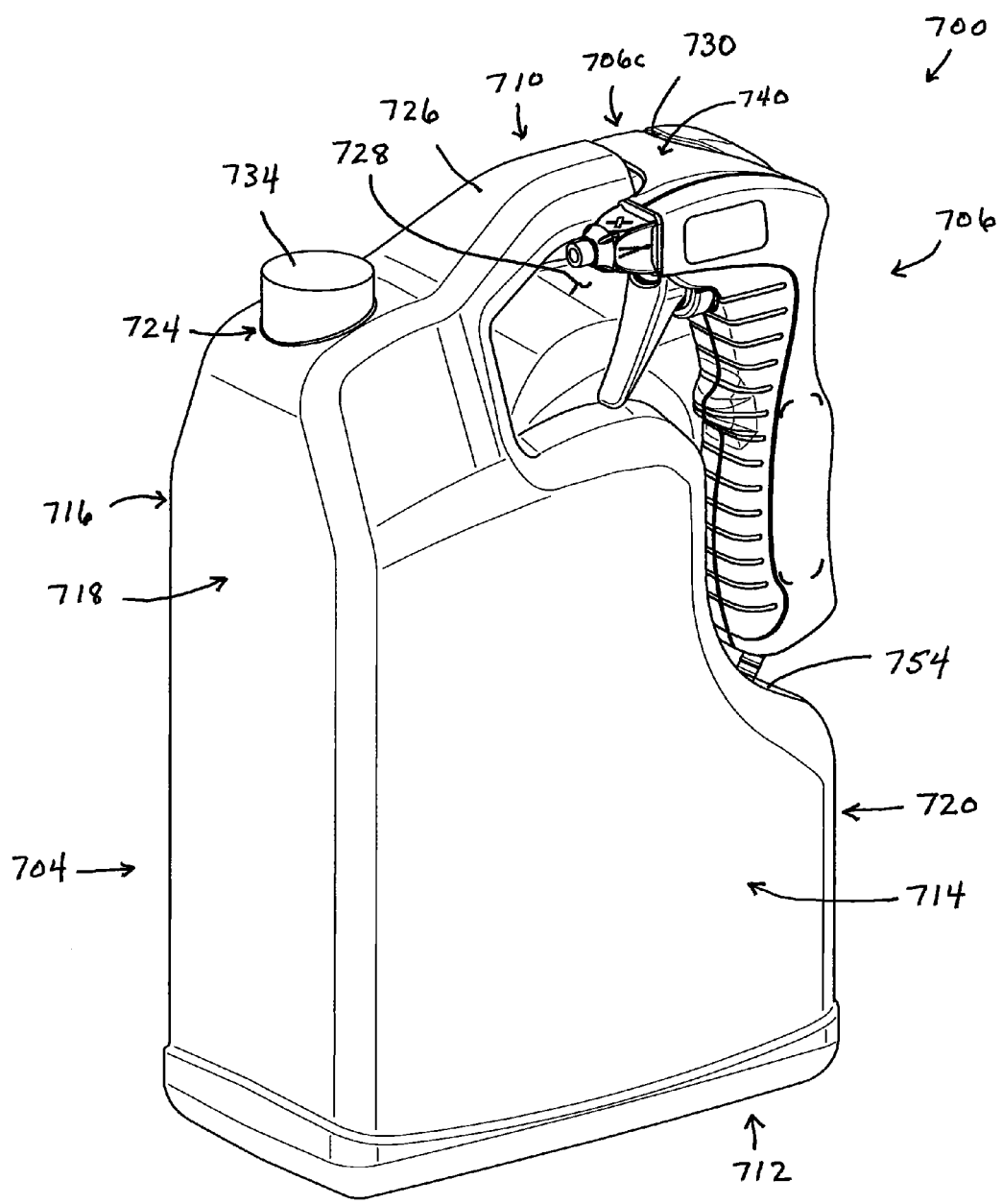
FIG. 36 is a perspective view of a dispensing assembly according to another example embodiment of the present disclosure.
Figure 37:
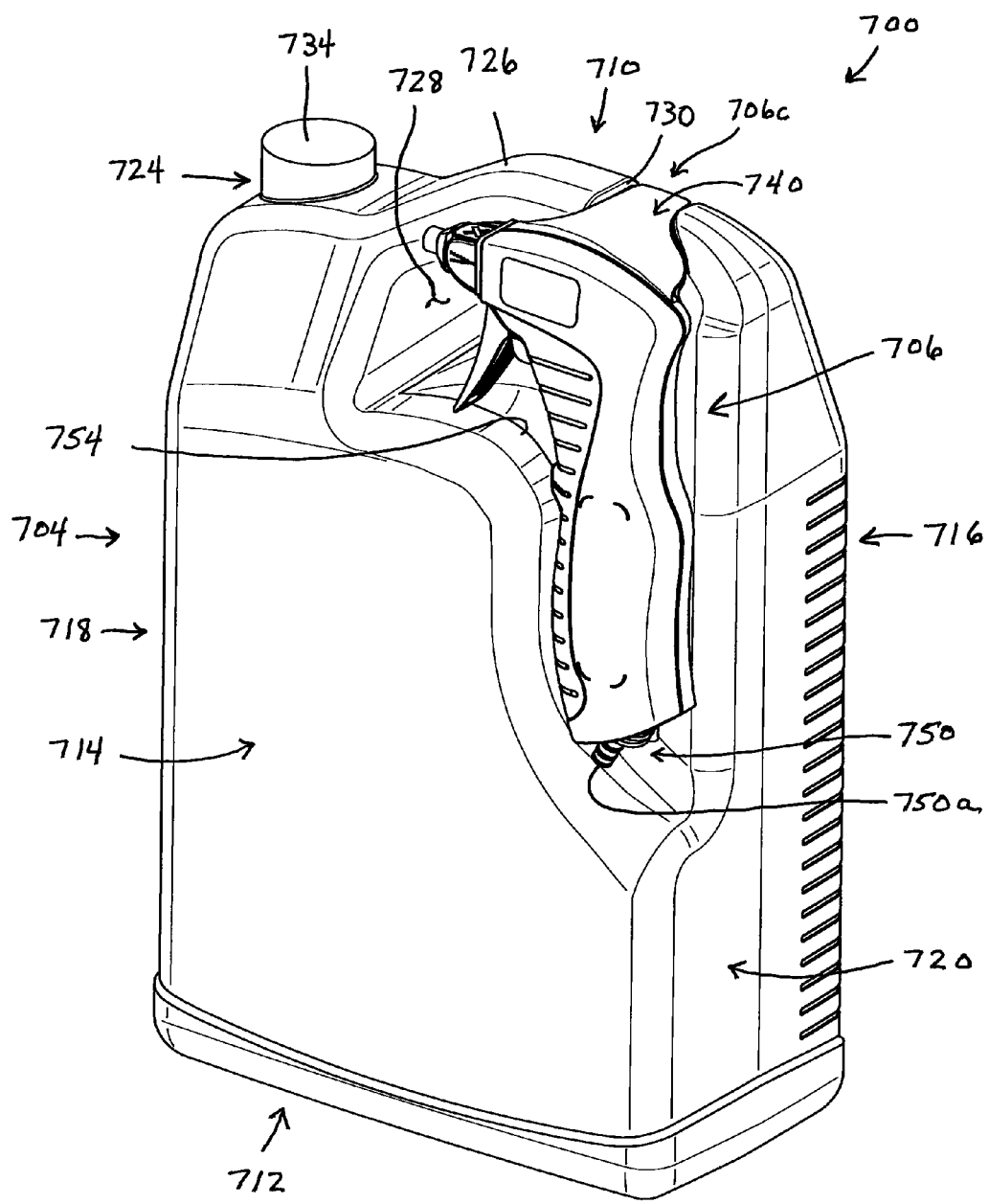
FIG. 37 is another perspective view of the dispensing assembly of FIG. 36.
Figure 38:
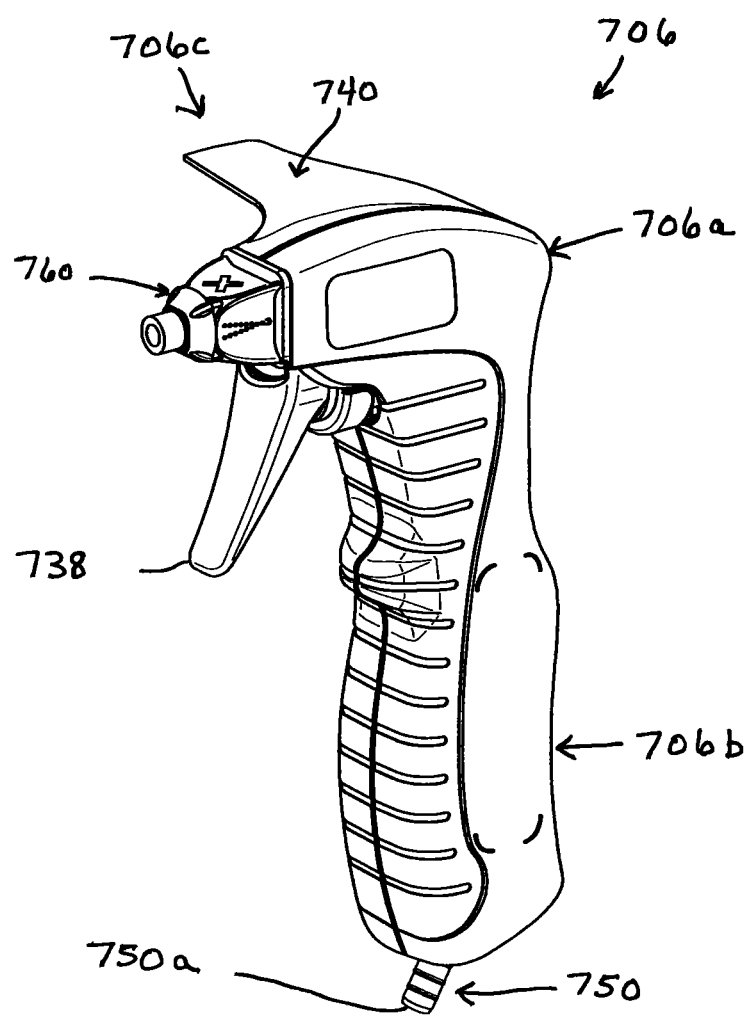
FIG. 38 is a perspective view of a sprayer of the dispensing assembly of FIG. 36.
Figure 39:
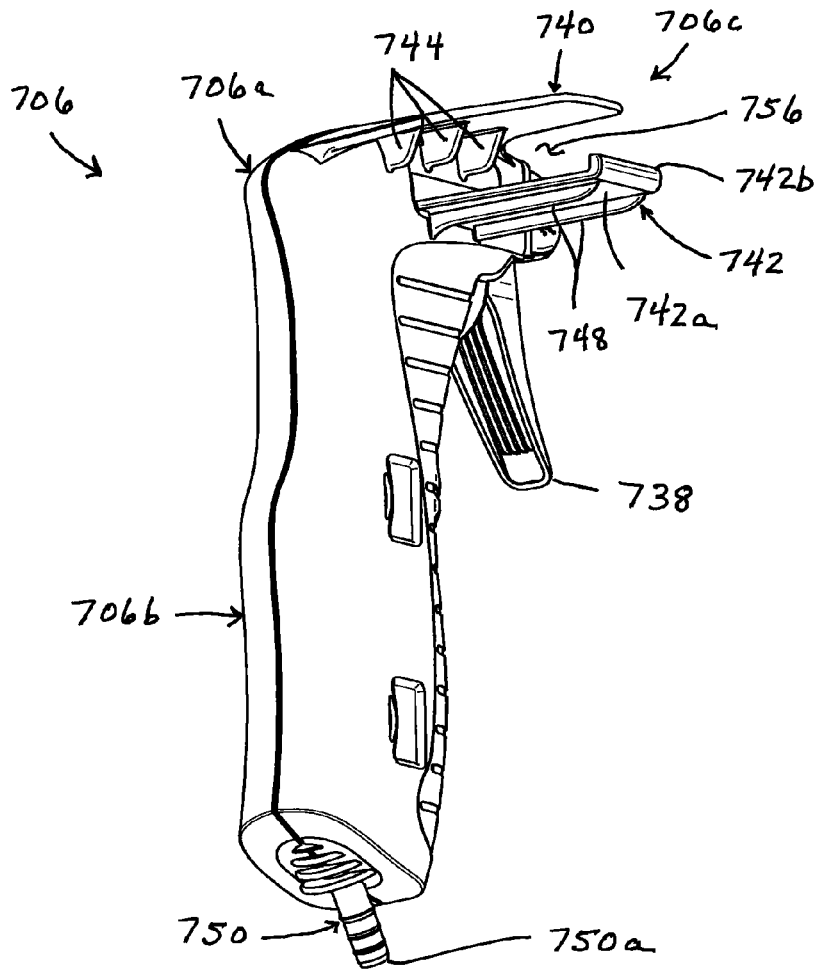
FIG. 39 is another perspective view of the sprayer of the dispensing assembly of FIG. 36.
Figure 40:
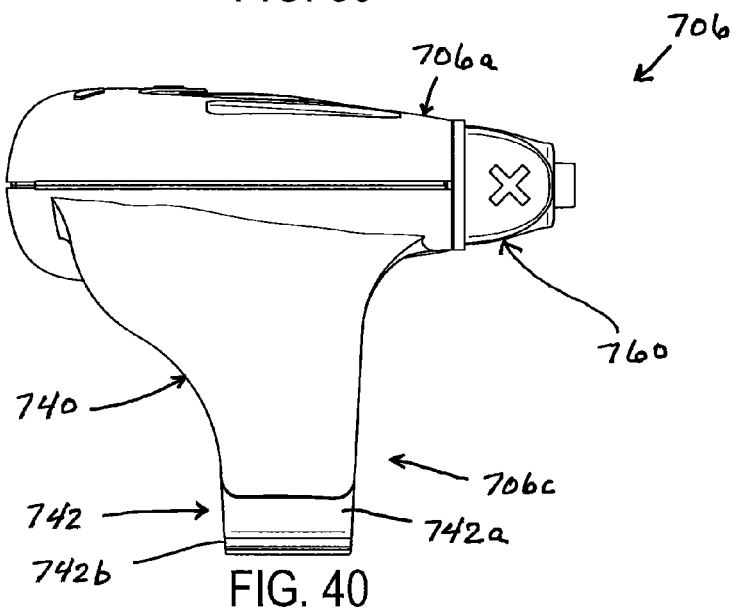
FIG. 40 is a top plan view of the sprayer of FIG. 38.
Figure 41:
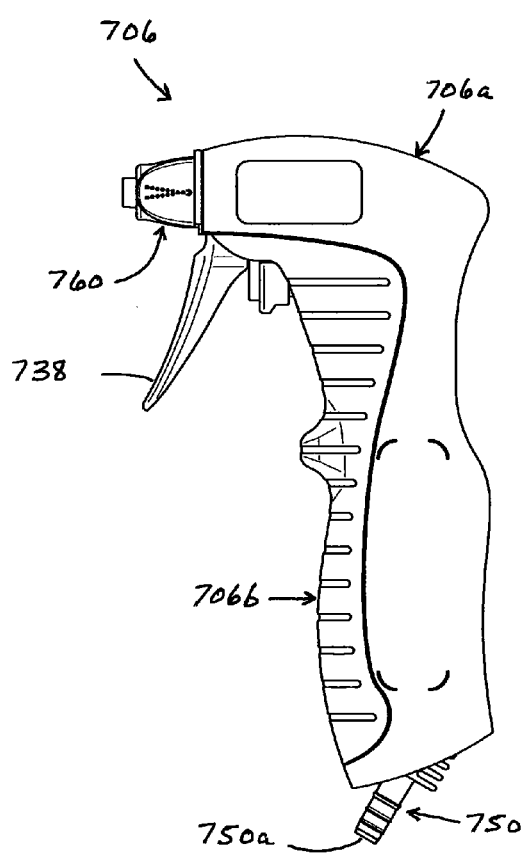
FIG. 41 is a front elevation view of the sprayer of FIG. 38.
Figure 42:
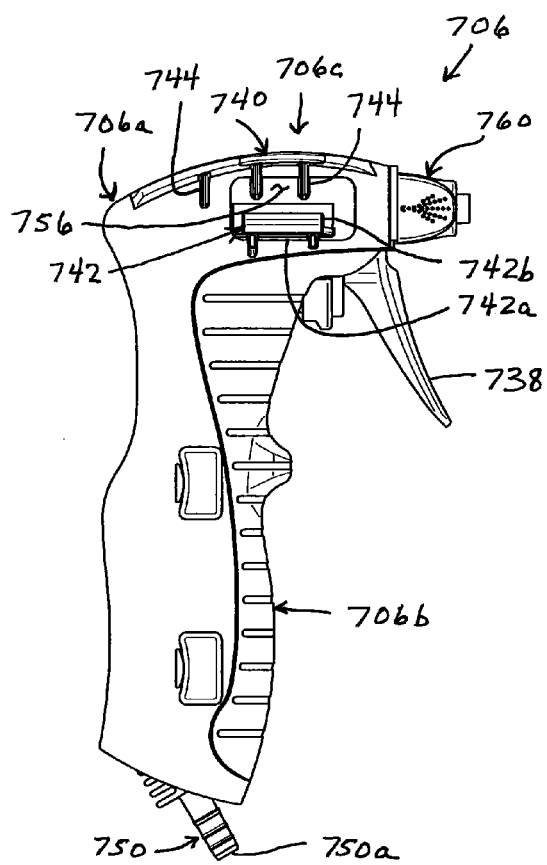
FIG. 42 is a rear elevation view of the sprayer of FIG. 38.
Figure 43:
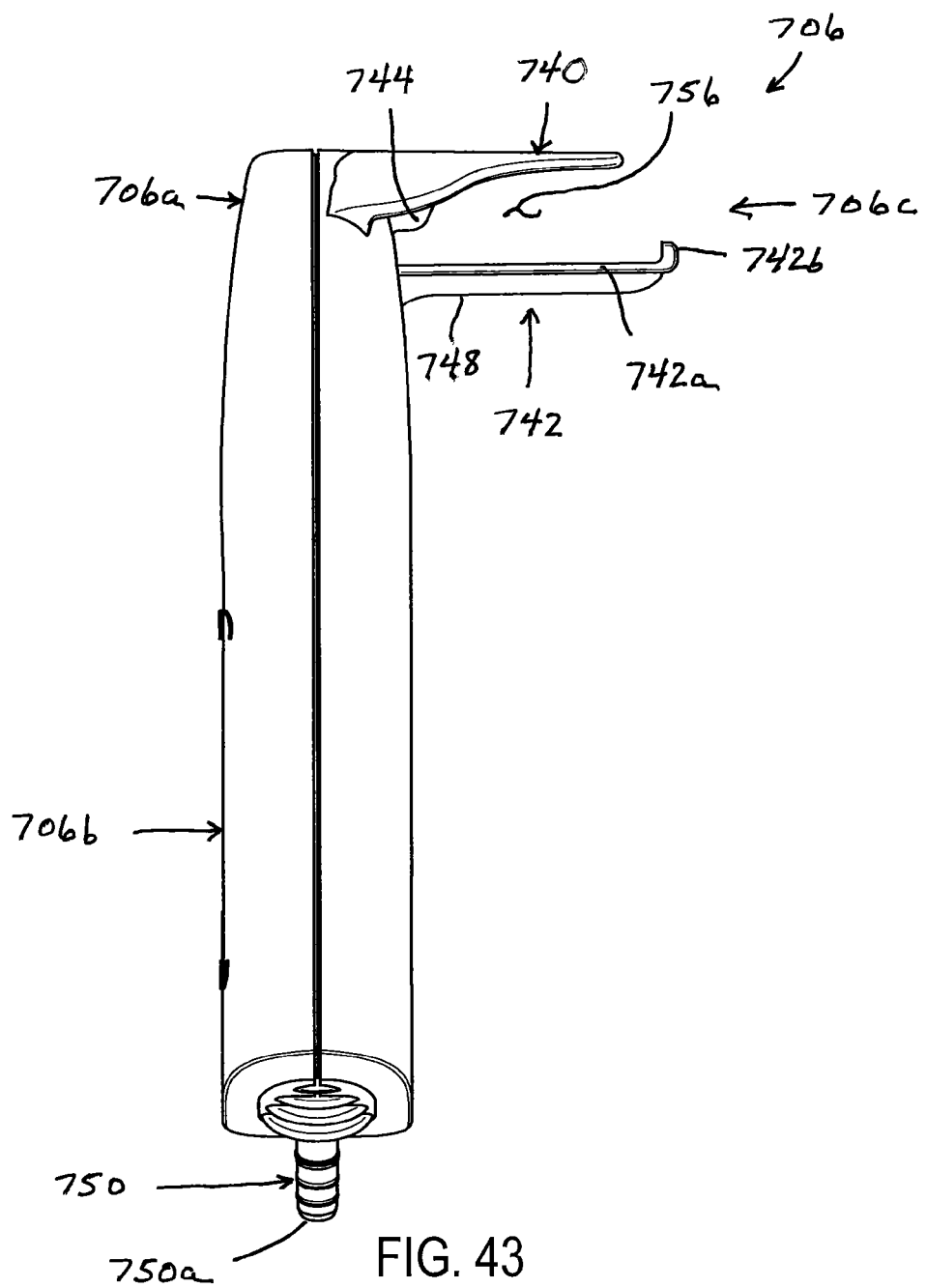
FIG. 43 is a side elevation view of the sprayer of FIG. 38.

As shown in FIGS. 36 and 37, the dispensing assembly 700 generally includes a container 704 and a sprayer 706. The container 704 is configured to hold fluid for use in the desired application of the dispensing assembly 700. And, the sprayer 706 is configured to draw fluid out of the container 704 for dispensing, applying, etc. the fluid at desired targets (e.g., unwanted insects, plants, etc.) associated with the application of the dispensing assembly 700.

The sprayer 706 of the illustrated dispensing assembly 700 can be selectively coupled to and uncoupled, removed, etc. from the container 704. For example, the sprayer 706 can be coupled (e.g., resiliently snap-fit, etc.) to the container 704 for commercial presentation (e.g., at the point of sale of the dispensing assembly 700, etc.), for storage, for transport, etc. of the dispensing assembly 700. Then, the sprayer 706 can be uncoupled from the container 704 when desired to dispense the fluid from the container 704 (via the sprayer 706). And, the sprayer 706 can then be recoupled (e.g., resiliently snap-fit, etc.) to the container 704 again for storage, transport, etc.

The container 704 of the illustrated dispensing assembly 700 is substantially similar to the container 104 illustrated in FIGS. 1-9. For example, the container 704 includes an upper portion 710, a lower portion 712, generally opposing forward and rearward walls 714, 716, and generally opposing side walls 718, 720. The upper portion 710, the lower portion 712, and the walls 714, 716, 718, 720 define a volume within the container 704 for holding fluid. The container 704 can have any desired volume within the scope of the present disclosure, for example (and without limitation), a one-half gallon volume, a one gallon volume, etc.

The upper portion 710 of the container 704 includes a spout 724 (broadly, an opening) and a handle 726. The spout 724 is in fluidic communication with the container 704 and is configured for receiving fluid into the container 704 and/or for use in dispensing fluid from the container 704. The handle 726 is configured for use in carrying the container 704 (and sprayer 706, when the sprayer is coupled to the container 704). The handle 726 extends generally horizontally along the upper portion 710 of the container 704, generally between the side wall 720 and the spout 724. An opening 728 is defined generally between the handle 726 and an upper surface of the container 704. The opening 728 is oriented such that, when a user grasps the handle 726, the user's hand and/or fingers can extend into the opening 728 and, if desired, around the handle 726. A groove 730 is provided around at least part of the handle 726 for use in coupling the sprayer 706 to the container 704 (as will be described in more detail hereinafter).

The container 704 also includes a cap 734 (broadly, a cover) removably coupled to the spout 724. The cap 734 allows for selectively covering and uncovering the spout 724 to selectively allow and inhibit access to the fluid in the container 704. In addition, the cap 734 is configured to fluidically couple the sprayer 706 to the container 704, as previously described in connection with dispensing assembly 100.

With reference now to FIGS. 38-43, the sprayer 706 of the illustrated dispensing assembly 700 includes a head portion 706a, a handle portion 706b, and an actuator 738 (e.g., a trigger, etc.). The head portion 706a and the handle portion 706b are arranged in a pistol-style configuration, with the handle portion 706b contoured to receive a hand of a user and the actuator 738 located adjacent the handle portion 706b to receive a finger of the user's hand.

In use of the dispensing assembly 700, a user can initially adjust (e.g., rotate, etc.) a tip portion 760 (or tip, or nozzle) of the sprayer 706 to select a desired spray setting (e.g., from a closed setting, indicated by the "X" on the tip portion 760, to one of the spray settings indicated by the various patterns on the tip portion 760, etc.). Then, with one hand, the user can grasp the handle portion 706b of the sprayer 706 and position a finger on the actuator 738 for dispensing fluid from the container 704, and with the other hand carry the container 704 via the handle 726. The user can then move the actuator 738 (e.g., pull the actuator 738 toward the handle portion 706b, pump the actuator 738, etc.) to thereby dispense fluid from the container 704. As such the dispensing assembly 700 can provide a mobile unit for a user to quickly and easily dispense fluid at desired targets. The sprayer 706 can include suitable valves and working mechanisms for dispensing (e.g., for drawing, sucking, etc.) fluid from the container 704 within the scope of the present disclosure. What's more, the sprayer 706 can be formed from any suitable materials (e.g., plastics, polymeric resinous material such as high density polyethylene (HDPE), composite materials, etc.) and/or by any suitable processes (e.g., molding processes, etc.) within the scope of the present disclosure.

The sprayer 706 of the illustrated dispensing assembly 700 also includes a clip portion 706c located adjacent the head portion 706a for use in coupling the sprayer 706 to the container 704. In this embodiment, the clip portion 706c includes upper and lower arms 740, 742 extending laterally away from the head portion 706a, and ribs 744 disposed along a side surface of the head portion 706a (generally below the upper arm 740). In addition in this embodiment, the upper and lower arms 740, 742 of the clip portion 706c are formed as one piece (e.g., monolithically, unitarily, etc.) with the head portion 706a.

The upper arm 740 of the clip portion 706c is formed generally continuously with an upper surface of the head portion 706a of the sprayer 706. The lower arm 742 is disposed generally below the upper arm 740 and extends generally outwardly from the head portion 706a of the sprayer 706. In this embodiment, the lower arm 742 defines a generally L-shape and includes a first portion 742a that is generally parallel to the upper arm 740 and a second portion 742b (or tab, or lip, etc.) extending generally upwardly from the first portion 742a. Ribs 748 are provided generally along the first portion 742a of the lower arm 742, for example, to help strengthen, etc. the first portion 742a. In other embodiments, dispensing assemblies may include sprayers in which clip portions of the sprayers include upper arms that define generally L-shapes and lower arms that are generally straight, or in which clip portions of the sprayers include upper and lower arms that define generally L-shapes.

The sprayer 706 of the illustrated dispensing assembly 700 further includes tubing 750 configured to fluidically couple the sprayer 706 to the container 704 for transporting fluid from the container 704 to the sprayer 706 (for dispensing). The tubing 750 extends through the handle portion 706b of the sprayer 706 and, at one end portion (not visible), operatively couples to the head portion 706a of the sprayer 706 (e.g., to valves, pumps, etc. in the sprayer 106). An opposite end portion 750a of the tubing 750 is then configured to selectively couple to the cap 734 of the container 704 (e.g., when desired to dispense fluid from the container 704, etc.). The tubing 750 is generally flexible. And, the flexibility of the tubing 750 permits the sprayer 706 to be moved in any direction relative to the container 704. With that said, the end portion 750a of the tubing 750 can couple to the cap 734 of the container 704 by any suitable operations, for example, as previously described for dispensing assembly 100, etc.

In the illustrated embodiment, the handle portion 706b of the sprayer 706 is generally hollow. As such, the tubing 750 can be positioned within the handle portion 706b when not in use (e.g., for storage, etc.). When desired to dispense fluid from the container 704 using the sprayer 706, the tubing 750 can then be removed from the handle portion 706b of the sprayer 706 and coupled to the container 704, via the cap 734, for providing fluid from the container 704 to the sprayer 706 through the tubing 750. After such use, the tubing 750 may be uncoupled from the cap 734 of the container 704 and repositioned within the handle portion 706b of the sprayer 706 (if desired).

With reference again to FIGS. 36 and 37, in the dispensing assembly 700, when the sprayer 706 is coupled to the container 704, the sprayer 706 is disposed generally along the forward wall 714 of the container 704 generally within a recess 754 defined by the forward wall 714. The head portion 706a of the sprayer 706 is disposed adjacent the opening 728 of the container 704 (e.g., next to the opening 728 of the container 704, at least partly in the opening 728 of the container 704, at the same vertical level as the opening 728 of the container 704, etc.) and toward the side wall 720 of the container 704. The actuator 738 of the sprayer 706 is located generally above the recess 754, and at the same general level as the opening 728 of the container 704.

The sprayer 706 is coupled to the container 704 via the clip portion 706c. In particular, a portion of the handle 726 at the groove 730 is received within a channel 756 defined by the upper and lower arms 740, 742 of the sprayer 706, with the upper arm 740 positioned over the handle 726 (and generally within the groove 730) and the lower arm 742 positioned under the handle 726 (and generally within the groove 730). In this position, the upper arm 740 is disposed along an upper portion of the handle 126. The first portion 742a of the lower arm 142 is disposed along a lower portion of the handle, and the second portion 742b of the lower arm 742 is disposed along, or extends around a part of, a rearward portion of the handle 726. As such, the lower arm 142 extends at least partly around the handle 726 of the container 704. And, the ribs 744 of the sprayer 706 engage a portion of the handle 126 to help inhibit undesired movement (or play) of the sprayer 706 relative to the container 704 (e.g., to help support the sprayer 706 on the container, etc.).

As in other embodiments, the upper and lower arms 740, 742 of the sprayer 706 are resiliently flexible to accommodate positioning (and repeated repositioning) of the arms 740, 742 over (and partly around) the handle 726 (e.g., for repeated removal and reattachment of the sprayer 706 to the handle 726 of the container 704, etc.). As such, the sprayer 706 (via the upper and lower arms 740, 742) is resiliently snap fit onto the handle 726 of the container 704. Further, the weight of the sprayer 706 combined with the offset positioning of the lower arm 742 relative to the upper arm 740 and the positioning of the ribs 744 (together with the snap fit coupling of the sprayer 706 onto the handle 726 of the container 704) may help hold (e.g., via a counterbalance effect, etc.) the sprayer on the container 704.

To uncouple the sprayer 706 from the container 704, the lower arm 742 of the sprayer 706 can be biased to release the second portion 742b from around the handle 726. The sprayer 706 can then be slid or pivoted off the handle 726 to move the entire arm 742 out of the groove 730 of the handle 726.

In the illustrated embodiment, the clip portion 706c of the sprayer 706 resiliently snap-fits to the handle 726 of the container 704. This allows for quick coupling and uncoupling of the sprayer 706 to and from the handle 726 of the container 704. In addition, the clip portion 706c provides a generally self-contained attachment means of the sprayer 706 to the container 704. Additional fasteners are not required to couple the sprayer 706 to the container 704 (although they may still be provided in some embodiments). Further, the clip portion 706c securely couples the sprayer 706 to the container 704 against inadvertent removal such that, in preparation for initial shipping and sale of the dispensing assembly 700, additional securing means (e.g., adhesive such as glue and tape, mechanical straps, shrink wrap, etc.) are not required for securing the sprayer 706 to the container 704.

Also in the illustrated embodiment, the sprayer 706 is coupled to the container 704 generally within a footprint defined by the container 704, and generally within a perimeter defined by the upper portion 710, lower portion 712, and walls 714, 716, 718, 720 of the container 704. The recess 754 defined by the forward wall 714 of the container 704 is configured to accommodate and receive substantially the entire sprayer 706 (e.g., the sprayer 706 nests within the recess 754 against the forward wall 714 of the container 704, etc.). As such, a forward side surface of the sprayer 706 is generally flush with a non-recessed surface portion of the forward wall 714. In addition, an upper surface of the head portion 706a and clip portion 706c of the sprayer 706 are generally flush, coplanar, align, etc. with the upper surface of the handle 726. And, a right side surface (as viewed in FIGS. 36 and 37) of the sprayer 706 is generally flush with the side wall 720 of the container 704. Thus, the sprayer 706 occupies no additional shelf space or box space than the container 704 would without the sprayer 706, which can allow the dispensing assembly 700 to be compactly boxed, stored, shipped, displayed, etc.

Also in the illustrated embodiment, the sprayer 706 is coupled to the handle 726 of the container 704 toward the upper portion of the container 704. As such, the recess 754 defined by the forward wall 714 of the container 704 is positioned generally higher on the container 704 which provides more volume within the container 704 below the recess 754 (as compared to other known containers). As a result, the overall depth of the container 704 (extending between the forward wall 714 and rearward wall 716) can be reduced without decreasing a total volume of the container 704. For example, the depth of the container 704 may be reduced by at least about 0.25 inches or more without decreasing the total volume of the container 704. In turn, the footprint of the container 704 can be reduced without decreasing the total volume of the container 704. What's more, the actuator 738 of the sprayer 706 is located generally above the recess 754, such that the recess can have a generally generic shape without having to specifically accommodate the actuator 738.

Further in the illustrated embodiment, the sprayer 706 is coupled to the container 704 along the forward wall 714 of the container 704. This positions the sprayer 706 in an immediately visible location to users (e.g., consumers, etc.) considering the dispensing assembly 700. As such, the sprayer 706 (e.g., the type of the sprayer 706, the size of the sprayer 706, etc.) can be readily considered by consumers viewing the dispensing assembly 700 on a shelf at a retail location in deciding to purchase the dispensing assembly 700.

The dispensing assembly 700 of the illustrated embodiment further provides a ready to use system for dispensing fluid. For example, the dispensing assembly 700 can be provided to a user with a premixed ready to spray liquid formulation in the container 704 and the sprayer 706 coupled to the container 704 ready for use to dispense the liquid formulation from the container 704. The sprayer 706 is simply uncoupled from the container 704, and the tubing 750 then coupled to the cap 734 of the container 704. The actuator 738 of the sprayer 706 can then be moved to draw fluid out of the container 704 for discharge onto desired targets. As such, the dispensing assembly 700 is shelf ready (e.g., ready for retailers to place on shelves for sale to consumers and ready for immediate use by consumers, etc.).

In other example embodiments of the present disclosure, dispensing assemblies generally includes containers and sprayers. In one of these example embodiments, a container has a height of about 12 inches, a width of about 7.75 inches, and a depth of about 4.25 inches. A handle opening of the container has a width of about 3.47 inches and a height of about 0.79 inches. And, a sprayer has a height of about 6.1 inches, a width of about 3.3 inches, and a depth of about 1.1 inches.

In other example embodiments of the present disclosure, dispensing assemblies may include sprayers and containers, where the sprayers include arms configured to resiliently snap-fit to vertical portions of handles of the containers. In so doing, the sprayers may be located within recesses defined by walls of the containers, and upper surfaces of the sprayers may be generally aligned with upper surfaces of the containers, when the sprayers are coupled to the containers. Here, the handles may be oriented along upper surfaces of the containers, along vertical surfaces (e.g., side walls, etc.) of the containers, etc.

In other example embodiments of the present disclosure, dispensing assemblies may include sprayers and containers where the sprayers include arms shaped substantially similar to the arms disclosure herein (e.g., arms 142, 242, 342, 442, 542, 642, 740, 742, etc.), but generally inverted. Here, the arms of the sprayers may be resiliently flexible to help provide a snap-fit coupling of the arms generally under (and at least partly around) the handles of the containers. For example, first portions of the arms may be disposed along lower portions of the handles, second portions of the arms may be disposed along rearward portions of the handles, and lips of the arms may be disposed generally over the handles.

In other example embodiments of the present disclosure, dispensing assemblies may include sprayers and containers where the sprayers (e.g., clip portions of the sprayers, etc.) couple to portions of the containers other than the handles. In these example embodiments, the sprayers are still located generally higher on the containers (when coupled to the containers) such that, for example, upper portions of the sprayers are still positioned generally coplanar, aligned, flush, etc. with upper portions of the containers (e.g., with upper portions of the handles of the containers when the containers include handles along their upper portions; with upper portions, upper surfaces, etc. of the containers when the containers do not include upper handles, etc.). For example, the sprayers may couple to upper surfaces of the containers below the handles (e.g., within openings defined below the handles, etc.), or to upper surfaces of the containers when the containers do not include such upper handles, or to side surfaces of the containers, or to vertical portions of handles of the containers, etc. Also for example, the sprayers may couple to the containers within openings defined below the handles of the containers (e.g., to upper surfaces of the containers below the handles and/or to lower surfaces of the handles.

Specific dimensions included herein are exemplary in nature and do not limit the scope of the present disclosure. In addition, specific dimensions included herein are provided within acceptable tolerances generally common in the art (e.g., dimensions with no decimal point may include tolerances of +/−0.12; dimensions with one decimal point may include tolerances of +/−0.6; dimensions with two decimal points may include tolerances of +/−0.03; etc.).

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A dispensing assembly for dispensing fluid, the dispensing assembly comprising:
    a container having a handle located toward an upper portion of the container for use in carrying the container, the container further having a forward wall defining a recess; and
    a sprayer having a clip portion for use in coupling the sprayer to the container, the clip portion defining a channel configured to receive at least part of the handle of the container within the channel to thereby couple the sprayer to the container;
    wherein the recess of the container is configured to receive the sprayer when the sprayer is coupled to the container such that the sprayer is disposed within a footprint of the container.

2. The dispensing assembly of claim 1, wherein the clip portion of the sprayer includes first and second arms extending away from the sprayer, the first and second arms defining the channel.

3. The dispensing assembly of claim 2, wherein the handle of the container includes a groove configured to receive at least part of the first and second arms of the clip portion of the sprayer therein when the sprayer is coupled to container.

4. The dispensing assembly of claim 2, wherein the handle of the container is positioned generally between the first and second arms of the clip portion of the sprayer when the sprayer is coupled to the container.

5. The dispensing assembly of claim 4, wherein at least one of the first and second arms of the clip portion of the sprayer includes a lip configured to extend at least partly around the handle of the container when the sprayer is coupled to container.

6. The dispensing assembly of claim 4, wherein the second arm of the clip portion of the sprayer includes a free end defining a lip configured to extend at least partly around the handle of the container when the sprayer is coupled to the container.

7. The dispensing assembly of claim 6, wherein the first arm of the clip portion of the sprayer is generally coplanar with an upper surface of the sprayer when the sprayer is coupled to the container.

8. The dispensing assembly of claim 1, wherein the clip portion of the sprayer includes at least one rib configured to engage the handle of the container when the sprayer is coupled to the container to help support the sprayer on the container.

9. A method of making a dispensing assembly suitable for use to dispense fluid at desired targets, the method comprising:
forming a container having a handle located toward an upper portion of the container;
forming a groove around at least part of the handle of the container; and
forming a sprayer having first and second arms extending away from the sprayer for use in coupling the sprayer to the handle of the container, the first and second arms defining a channel therebetween configured to receive at least part of the handle of the container into the channel, with the groove of the handle receiving at least part of the first and second arms, to thereby couple the sprayer to the handle of the container.

10. The method of claim 9, wherein forming a sprayer having first and second arms includes forming the first arm with a generally planar shape, and forming the second arm generally below the first arm with a generally L-shape.

11. The method of claim 10, wherein forming a sprayer further includes forming the sprayer with a head portion and a handle portion arranged in a pistol-style configuration.

12. The method of claim 11, wherein forming a sprayer further includes forming the first and second arms of the sprayer monolithically with the head portion of the sprayer.

13. The method of claim 9, wherein forming a sprayer includes forming the first arm of the sprayer to be generally coplanar with an upper surface of the sprayer when the sprayer is coupled to the handle of the container, and forming the second arm of the sprayer generally below the first arm and with a lip configured to extend at least partly around the handle of the container when the sprayer is coupled to the handle of the container.

14. A dispensing assembly for dispensing fluid at desired targets, the dispensing assembly comprising:
a container having an upper portion, and a handle located toward the upper portion for use in carrying the container; and
a sprayer having:
a head portion;
first and second arms extending away from the head portion, the first and second arms configured to receive at least part of the handle of the container between the arms for coupling the sprayer to the container; and
at least one rib disposed generally between the first and second arms and configured to engage the handle of the container when the sprayer is coupled to the container to help support the sprayer on the container.

15. The dispensing assembly of claim 14, wherein at least one of the first and second arms of the sprayer includes a lip configured to extend at least partly around the handle of the container when the sprayer is coupled to the container.

16. The dispensing assembly of claim 14, wherein the first arm of the sprayer is generally coplanar with an upper surface of the sprayer.

17. The dispensing assembly of claim 16, wherein the second arm of the sprayer includes a free end defining a lip configured to extend at least partly around the handle of the container when the sprayer is coupled to the container.

18. A dispensing assembly for dispensing fluid, the dispensing assembly comprising:
a container having a handle located toward an upper portion of the container for use in carrying the container, the handle including a groove; and
a sprayer having a clip portion for use in coupling the sprayer to the container, the clip portion including first and second arms extending away from the sprayer, the first and second arms defining a channel configured to receive at least part of the handle of the container within the channel to thereby couple the sprayer to the container, with the groove of the handle receiving at least part of the first arm and/or the second arm.

19. A dispensing assembly for dispensing fluid, the dispensing assembly comprising:
a container having a handle located toward an upper portion of the container for use in carrying the container; and
a sprayer having a clip portion for use in coupling the sprayer to the container, the clip portion defining a channel configured to receive at least part of the handle of the container within the channel to thereby couple the sprayer to the container, the clip portion further including at least one rib configured to engage the handle of the container when the sprayer is coupled to the container.

20. A method of making a dispensing assembly suitable for use to dispense fluid at desired targets, the method comprising:
forming a container having a handle located toward an upper portion of the container;
forming a sprayer having first and second arms extending away from the sprayer for use in coupling the sprayer to the handle of the container, the first and second arms defining a channel therebetween configured to receive at least part of the handle of the container into the channel to thereby couple the sprayer to the handle of the container; and
forming the first arm of the sprayer to be generally coplanar with an upper surface of the sprayer when the sprayer is coupled to the handle of the container, and forming the second arm of the sprayer generally below the first arm and with a lip configured to extend at least partly around the handle of the container when the sprayer is coupled to the handle of the container.

* * * * *